(12) United States Patent
Furuichi

(10) Patent No.: US 12,376,144 B2
(45) Date of Patent: Jul. 29, 2025

(54) COMMUNICATION CONTROL DEVICE, COMMUNICATION CONTROL METHOD, COMMUNICATION DEVICE, AND COMMUNICATION METHOD

(71) Applicant: Sony Group Corporation, Tokyo (JP)

(72) Inventor: Sho Furuichi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 475 days.

(21) Appl. No.: 17/907,970

(22) PCT Filed: Mar. 18, 2021

(86) PCT No.: PCT/JP2021/011203
§ 371 (c)(1),
(2) Date: Aug. 30, 2022

(87) PCT Pub. No.: WO2021/200237
PCT Pub. Date: Oct. 7, 2021

(65) Prior Publication Data
US 2023/0026783 A1    Jan. 26, 2023

(30) Foreign Application Priority Data
Mar. 31, 2020   (JP) ................................ 2020-064149

(51) Int. Cl.
*H04W 72/566*    (2023.01)
*H04W 36/06*    (2009.01)
*H04W 68/00*    (2009.01)

(52) U.S. Cl.
CPC ......... *H04W 72/566* (2023.01); *H04W 36/06* (2013.01); *H04W 68/005* (2013.01)

(58) Field of Classification Search
CPC . H04W 72/566; H04W 36/06; H04W 68/005; H04W 72/541; H04W 16/14
See application file for complete search history.

(56) References Cited

U.S. PATENT DOCUMENTS

| | | | | |
|---|---|---|---|---|
| 2013/0324174 A1* | 12/2013 | Mueck | ................. | H04W 16/14 455/509 |
| 2021/0022011 A1* | 1/2021 | Furuichi | ............... | H04W 16/14 |
| 2022/0158810 A1* | 5/2022 | Tsuda | .................... | H04W 16/06 |

FOREIGN PATENT DOCUMENTS

| | | |
|---|---|---|
| CN | 103458515 A | 12/2013 |
| DE | 102013105606 A1 | 12/2013 |

(Continued)

OTHER PUBLICATIONS

International Search Report and Written Opinion mailed on Jun. 15, 2021, received for PCT Application PCT/JP2021/011203, filed on Mar. 18, 2021, 8 pages including English Translation.

(Continued)

*Primary Examiner* — Khoa Huynh
(74) *Attorney, Agent, or Firm* — XSENSUS LLP

(57) ABSTRACT

Provided are a communication control device, a communication control method, a communication device, and a communication method capable of changing priority of radio wave use.

A communication control device according to the present disclosure includes: an acquirer configured to acquire application data for changing a priority of radio wave use of a communication device from a second priority lower than a first priority to the first priority on the basis of a right to perform radio wave use with the first priority; a receiver configured to receive a frequency use notification notifying that the communication device is performing the radio wave use with the second priority; and a processor configured to update the priority of the radio wave use by the communication device from the second priority to the first priority in a case where the frequency use notification is received after the application data is acquired.

19 Claims, 13 Drawing Sheets

(56) References Cited

FOREIGN PATENT DOCUMENTS

| WO | WO-2018215974 A1 | 11/2018 |
| WO | WO-2019125470 A1 | 6/2019 |
| WO | 2019/187507 A1 | 10/2019 |
| WO | WO-2019199784 A2 | 10/2019 |

OTHER PUBLICATIONS

"Spectrum Sharing Committee CBRS Release Plan", WINNF-SSC-0004-V14.0.0, Available Online at: https://cbrs.wirelessinnovation.org/policies and procedures, Aug. 21, 2018, 18 pages.

"Test and Certification for Citizens Broadband Radio Service (CBRS); Conformance and Performance Test Technical Specification; SAS as Unit Under Test (UUT)", WINNF-TS-0061-V1.5.1, Available Online at: https://cbrs.wirelessinnovation.org/release-1-of-the-baseline-standard-specifications, Oct. 7, 2019, pp. 1-180.

"Subpart X-Spectrum Leasing", Electronic Code of Federal Regulations, Title 47, Chapter I, Subchapter A, Part 1, Available Online At: https://www.ecfr.gov/cgi-bin/text-idx?node=sp47.1.1.x, pp. 432-454, Nov. 25, 2003.

"Part 96—Citizens Broadband Radio Service", Electronic Code of Federal Regulations, Title 47, Chapter I, Subchapter D, Available Online At: https://www.ecfr.gov/cgi-bin/text-idx?node=pt47.5.96], pp. 590-608, Jun. 23, 2015.

\* cited by examiner

COMMUNICATION CONTROL DEVICE, COMMUNICATION CONTROL METHOD, COMMUNICATION DEVICE, AND COMMUNICATION METHOD

CROSS-REFERENCE TO RELATED APPLICATIONS

The present application is based on PCT filing PCT/JP2021/011203, filed Mar. 18, 2021, which claims priority to JP 2020-064149, filed Mar. 31, 2020, the entire contents of each are incorporated herein by reference.

TECHNICAL FIELD

The present disclosure provides a communication control device, a communication control method, a communication device, and a communication method.

BACKGROUND ART

Hitherto, due to an increase in a wireless environment in which various wireless systems are mixed and an enrichment of content provided via radio, a problem of exhaustion of radio resources (for example, the frequency) that can be allocated to the wireless systems has become apparent. Therefore, as a means for extracting necessary radio resources, "dynamic spectrum access (DSA)" that utilizes temporal and spatial vacancies (white spaces) among frequency bands allocated to a specific wireless system has rapidly attracted attention.

CITATION LIST

Non-Patent Document

Non-Patent Document 1: WINNF-SSC-0004-V14.0.0 Spectrum Sharing Committee CBRS Release Plan [available at https://cbrs.wirelessinnovation.org/policies-and-procedures]
Non-Patent Document 2: Electronic Code of Federal Regulations, Title 47, Chapter I, Subchapter D, Part 96 Citizens Broadband Radio Service [available at https://www.ecfr.gov/cgi-bin/text-idx?node=pt47.5.96]
Non-Patent Document 3: Electronic Code of Federal Regulations, Title 47, Chapter I, Subchapter A, Part 1, Subpart X Spectrum Leasing [available at https://www.ecfr.gov/cgi-bin/text-idx?node=sp47.1.1.x]
Non-Patent Document 4: WINNF-TS-0061-V1.5.1 Test and Certification for Citizens Broadband Radio Service (CBRS); Conformance and Performance Test Technical Specification; SAS as Unit Under Test (UUT) [available at https://cbrs.wirelessinnovation.org/release-1-of-the-baseline-standard-specifications]

SUMMARY OF THE INVENTION

Problems to be Solved by the Invention

As a frequency sharing standard of the 3550 to 3700 MHz band in the United States, there is a standard group called CBRS Baseline Standards of Wireless Innovation Forum (WlnnForum) Spectrum Sharing Committee (SSC).

In this standard group, WINNF-TS-0016 defines a signaling protocol between a spectrum access system (SAS) which is a frequency management server, a citizens broadband radio service device (CBSD) which is a base station proxy system, and a domain proxy (DP). By following this protocol, CBSD can use radio waves with priority of priority access (PA) or general authorized access (GAA).

Permission and authorization related to radio wave use are performed by SAS. As for the permission and authorization, SAS reviews a set of the maximum allowable EIRP (Equivalent Isotropic Radiated Power) and the frequency channel (frequency band between the upper and lower frequencies) requested from CBSD and approves the requested maximum allowable EIRP and frequency channel as grant (Grant). Upon approval of the grant by SAS, CBSD is notified of the priority of either PA or GAA from SAS. The radio wave use of CBSD based on the grant is managed by a procedure called heartbeat between SAS and CBSD.

Here, there is a constraint that "the parameter of the grant cannot be changed, and in a case where the parameter is changed, it is necessary to apply for the grant again". This restriction may become a problem in the future. As an assumed situation, it is conceivable that an operator wants to upgrade a grant of CBSD operated in GAA from GAA to PA, or wants to fall back (Fallback) a grant of CBSD operated in PA to GAA. For example, it is conceivable that a request for upgrade or fallback occurs in a case where a PAL (Priority Access License) is newly acquired in an auction, in a case where the PAL is borrowed from another operator, in a case where the PAL expires. According to the current mechanism, even in such a situation, the CBSD operator needs to reapply for a grant to SAS. For this reason, there is a concern that the radio wave transmission is stopped until the permission for reapplication is obtained, and the end user experience that occurs in association therewith is deteriorated. A mechanism that can upgrade the PAL to the GAA and fall back the PAL to the GAA at a high speed is desired.

The present disclosure provides a communication control device, a communication control method, a communication device, and a communication method capable of changing priority of radio wave use.

Solutions to Problems

A communication control device according to the present disclosure includes:
an acquirer configured to acquire application data for changing a priority of radio wave use of a communication device from a second priority lower than a first priority to the first priority on the basis of a right to perform radio wave use with the first priority;
a receiver configured to receive a frequency use notification notifying that the communication device is performing the radio wave use with the second priority; and
a processor configured to update the priority of the radio wave use by the communication device from the second priority to the first priority in a case where the frequency use notification is received after the application data is acquired.

The communication control device may include a transmitter configured to transmit, in response to the frequency use notification, response information for notifying that the priority of the radio wave use of the communication device has been changed from the second priority to the first priority.

The processor may set an expiration time of radio wave use by the communication device with the first priority on the basis of the right.

The processor may set a frequency band permitted to be used with the first priority on the basis of a frequency range in which a frequency band available with the first priority and a frequency band used by the communication device with the second priority are common.

The processor may determine a frequency channel included in the common frequency range among frequency channels available with the first priority as a frequency band available with the first priority.

The application data may include a request for creating, by one or more of the communication devices, a coverage area for protecting radio wave use with the first priority from interference due to radio wave use with the second priority.

The communication control device may include a controller configured to create the coverage area on the basis of the application data and protect the radio wave use with the first priority from interference due to the radio wave use with the second priority in the coverage area.

The application data may include an identifier for identifying the right.

The application data may include information on a frequency band for which the priority of the radio wave use is to be changed from a second priority lower than the first priority to the first priority.

The receiver may receive a frequency use notification notifying that the communication device is performing the radio wave use with the first priority, the processor may update the priority of the radio wave use by the communication device from the first priority to the second priority in a case where the processor detects that a requirement for retaining the right is no longer satisfied, and the transmitter may transmit response information for notifying that the priority of the radio wave use of the communication device has been changed from the first priority to the second priority.

A communication device of the present disclosure is a communication device of an operator that has a right to perform radio wave use with a first priority, the communication device including: a transmitter configured to transmit a frequency use notification notifying that the radio wave use is performed with a second priority lower than the first priority;

a receiver configured to receive response information transmitted in response to the frequency use notification; and a processor configured to update the priority of the radio wave use from the second priority to the first priority in a case where the response information includes information for changing the priority of the radio wave use from the second priority to the first priority.

The transmitter may transmit a frequency use notification notifying that the radio wave use is performed with the first priority, the receiver may receive response information transmitted in response to the frequency use notification, and the processor may update the priority of the radio wave use from the first priority to the second priority in a case where the response information includes information for changing the priority of the radio wave use from the first priority to the second priority.

A communication control method of the present disclosure includes:

acquiring application data for changing a priority of radio wave use of a communication device from a second priority lower than a first priority to the first priority on the basis of a right to perform radio wave use with the first priority;

receiving a frequency use notification notifying that the communication device is performing the radio wave use with the second priority; and updating the priority of the radio wave use by the communication device from the second priority to the first priority in a case where the frequency use notification is received after the application data is acquired.

A communication method of the present disclosure is a communication method performed by a communication device of an operator having a right to perform radio wave use with a first priority, the communication method including: transmitting a frequency use notification notifying that the radio wave use is performed with a second priority lower than the first priority;

receiving response information transmitted in response to the frequency use notification; and updating the priority of the radio wave use from the second priority to the first priority in a case where the response information includes information for changing the priority of the radio wave use from the second priority to the first priority.

MODE FOR CARRYING OUT THE INVENTION

Hereinafter, embodiments of the present disclosure will be described with reference to the drawings. In one or more embodiments illustrated in the present disclosure, the elements included in each embodiment can be combined with each other, and the combined result also forms a part of the embodiments illustrated in the present disclosure.

<<1. Representative Possible Scenario>>

<1.1 System Model>

Figure 1:
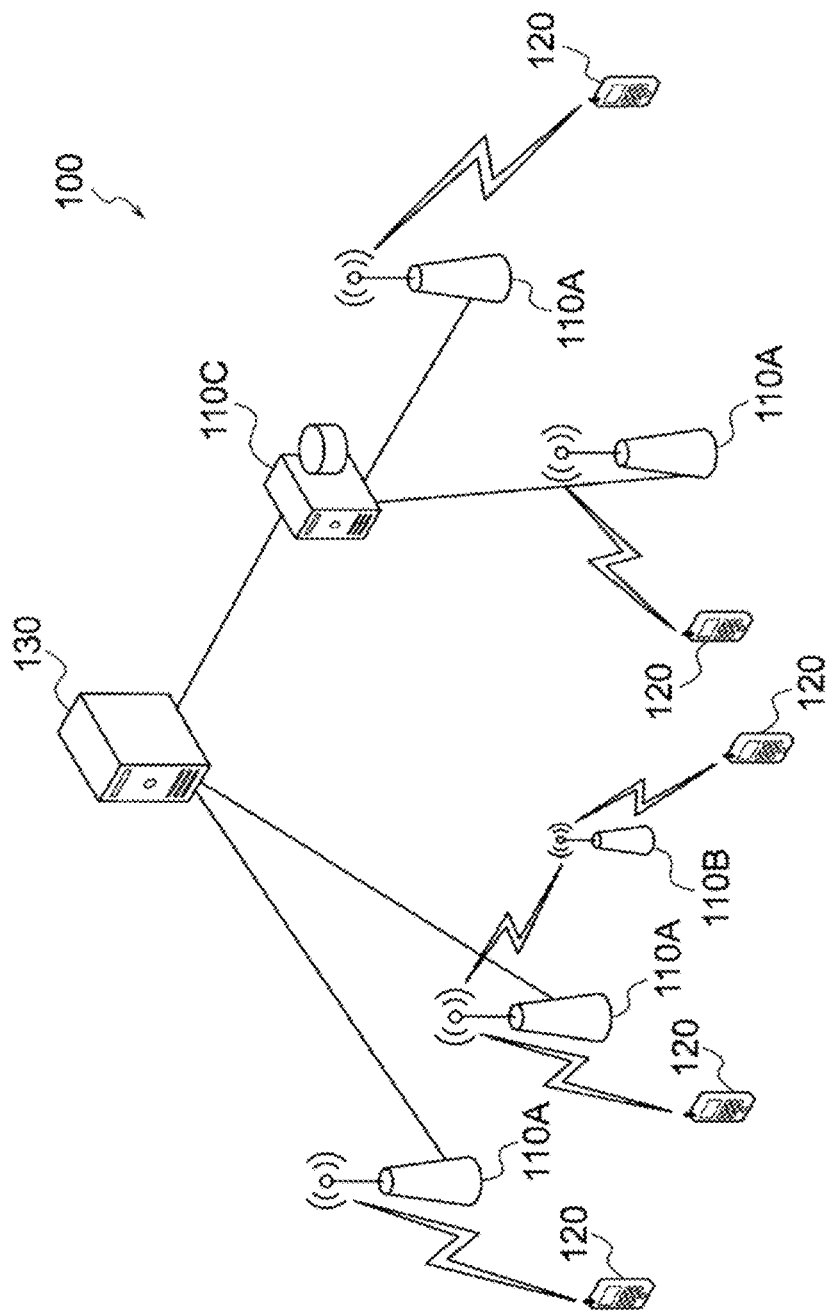
FIG. 1 is a diagram illustrating a system model according to an embodiment of the present disclosure.

FIG. 1 illustrates a system model in an embodiment of the present invention. As illustrated in FIG. 1, the system model is represented by a communication network 100 including wireless communication, and typically includes the following entities.

Communication device 110

Terminal 120

Communication control device 130

Further, the system model also includes at least primary and secondary systems utilizing the communication network 100. The primary system and the secondary system are configured by the communication device 110 or the communication device 110 and the terminal 120. Various communication systems can be treated as a primary system or a secondary system. However, in the present embodiment, the primary system is a wireless system that uses a specific frequency band, and the secondary system is a wireless system that shares a part or the entire part of the frequency band. That is, the present system model will be described as a model of a wireless communication system related to dynamic frequency sharing (dynamic spectrum access (DSA)). Note that the present system model is not limited to a system related to dynamic frequency sharing.

Typically, the communication device 110 is a wireless device that provides a wireless communication service to the terminal 120, such as a wireless base station (Base Station, Node B, eNB, gNB, and the like) or a wireless access point. That is, the communication device 110 provides a wireless communication service to enable wireless communication of the terminal 120. Furthermore, the communication device 110 may be a wireless relay device or an optical extension device called a remote radio head (RRH). In the following description, unless otherwise noted, the communication device 110 will be described as an entity constituting a secondary system.

The coverage (communication area) provided by the communication device 110 is allowed to have various sizes from a large size such as a macro cell to a small size such as a picocell. Like a distributed antenna system (DAS), a plurality of communication devices 110 may form one cell. Furthermore, in a case where the communication device 110 has a beamforming capability, a cell or a service area may be formed for each beam.

In the present disclosure, it is assumed that there are two different types of communication devices 110.

In the present disclosure, a communication device 110 that can access the communication control device 130 without using a wireless path that requires permission of the communication control device 130 is referred to as a "communication device 110A". Specifically, for example, the communication device 110 capable of wired Internet connection can be regarded as a "communication device 110A". In addition, for example, even in a wireless relay device that does not have a wired Internet connection function, if a wireless backhaul link using a frequency that does not require permission of the communication control device 130 is constructed with another communication device 110A, such a wireless relay device may also be regarded as the "communication device 110A".

In the present disclosure, a communication device 110 that cannot access the communication control device 130 without a wireless path that requires permission of the communication control device 130 is referred to as a "communication device 110B". For example, a wireless relay device that needs to construct a backhaul link using a frequency that requires permission of the communication control device 130 can be regarded as a "communication device 110B". Furthermore, for example, a device such as a smartphone having a wireless network provision function typified by tethering and using a frequency that requires permission of the communication control device 130 in both the backhaul link and the access link may be treated as the "communication device 110B".

The communication device 110 is not necessarily fixedly installed. For example, the communication device 110 may be installed in a moving object such as an automobile. Furthermore, the communication device 110 does not necessarily need to exist on the ground. For example, the communication device 110 may be included in an object existing in the air or space, such as an aircraft, a drone, a helicopter, a high altitude platform station (HAPS), a balloon, or a satellite. Furthermore, for example, the communication device 110 may be included in an object existing on the sea or under the sea, such as a ship or a submarine. Typically, such a mobile communication device 110 corresponds to the communication device 110B, and performs wireless communication with the communication device 110A to secure an access path to the communication control device 130. As a matter of course, even the mobile communication device 110 can be treated as the communication device 110A as long as the frequency used in the wireless communication with the communication device 110A is not managed by the communication control device 130.

In the present disclosure, unless otherwise noted, the description "communication device 110" includes both meanings of the communication device 110A and the communication device 110B, and may be replaced with either one.

The communication device 110 can be used, operated, or managed by various operators. For example, a mobile network operator (MNO), a mobile virtual network operator (MVNO), a mobile network enabler (MNE), a mobile virtual network enabler (MVNE), a shared facility operator, a neutral host network (NHN) operator, a broadcaster, an enterprise, an educational institution (educational institutions, boards of education of local governments, and the like), a real estate (building, apartment, and the like) administrator, an individual, and the like can be assumed as operators related to the communication device 110. Note that the operator related to the communication device 110 is not particularly limited. Furthermore, the communication device 110A may be a shared facility used by a plurality of operators. In addition, different operators may perform installation, use, and management of the facilities.

The communication device 110 operated by the operator is typically connected to the Internet via a core network. In addition, operation, management, and maintenance are performed by a function called OA&M (Operation, Administration & Maintenance). Furthermore, for example, as illustrated in FIG. 1, there may be an intermediate device (network manager) 110C that integrally controls the communication device 110 in the network. Note that the intermediate device may be the communication device 110 or the communication control device 130.

The terminal 120 (User Equipment, User Terminal, User Station, Mobile Terminal, Mobile Station, and the like) is a device that performs wireless communication by a wireless communication service provided by the communication device 110. Typically, a communication device such as a smartphone corresponds to the terminal 120. Note that a device having a wireless communication function can correspond to the terminal 120. For example, a device such as a business camera having a wireless communication function can also correspond to the terminal 120 even if the wireless communication is not a main application. In addition, a communication device that transmits data to the terminal 120, such as a broadcasting field pickup unit (FPU) that transmits an image for television broadcasting or the like from a broadcast station (site) to the broadcast station in order to perform sports relay or the like, also corresponds to the terminal 120. Furthermore, the terminal 120 is not necessarily used by a person. For example, like so-called machine type communication (MTC), a device such as a factory machine or a sensor installed in a building may be network-connected to operate as the terminal 120. In addition, a device called customer premises equipment (CPE) provided to ensure Internet connection may behave as the terminal 120.

Furthermore, as represented by device-to-device (D2D) and vehicle-to-everything (V2X), the terminal 120 may include a relay communication function.

In addition, similarly to the communication device 110, the terminal 120 does not need to be fixedly installed or exist on the ground. For example, an object existing in the air or space, such as an aircraft, a drone, a helicopter, a satellite, or the like, may operate as the terminal 120. Furthermore, for example, an object existing on the sea or under the sea, such as a ship or a submarine, may operate as the terminal 120.

In the present disclosure, unless otherwise noted, the terminal 120 corresponds to an entity that terminates a radio link using a frequency that requires permission of the communication control device 130. However, depending on a function included in the terminal 120 or an applied network topology, the terminal 120 can perform an operation equivalent to that of the communication device 110. In other words, depending on the network topology, a device that can correspond to the communication device 110 such as a wireless access point may correspond to the terminal 120, or a device that can correspond to the terminal 120 such as a smartphone may correspond to the communication device 110.

The communication control device 130 is typically a device that determines, permits, instructs, and/or manages communication parameters of the communication device 110. For example, database servers called TV white space database (TVWSDB), geolocation database (GLDB), spectrum access system (SAS), and automated frequency coordination (AFC) correspond to the communication control device 130. In addition, for example, a control device that performs radio wave interference control between devices defined by standards represented by EN 303 387, Institute of Electrical and Electronics Engineers (IEEE) 802.19.1-2018, CBRSA-TS-2001, and the like of European Telecommunications Standards Institute (ETSI) also corresponds to the communication control device 130. Furthermore, for example, a registered location secure server (RLSS) defined in IEEE 802.11-2016 also corresponds to the communication control device 130. That is, without being limited to these examples, an entity responsible for determination, use permission, instruction, management, and the like of the communication parameters of the communication device 110 may be referred to as the communication control device 130. Basically, the control target of the communication control device 130 is the communication device 110, but the communication control device 130 may control the terminal 120 under the control of the communication device 110.

There may be a plurality of communication control devices 130. In a case where there is a plurality of communication control devices 130, at least one of the following three types of decision-making topologies can be applied to the communication control device 130.

Figure 2:
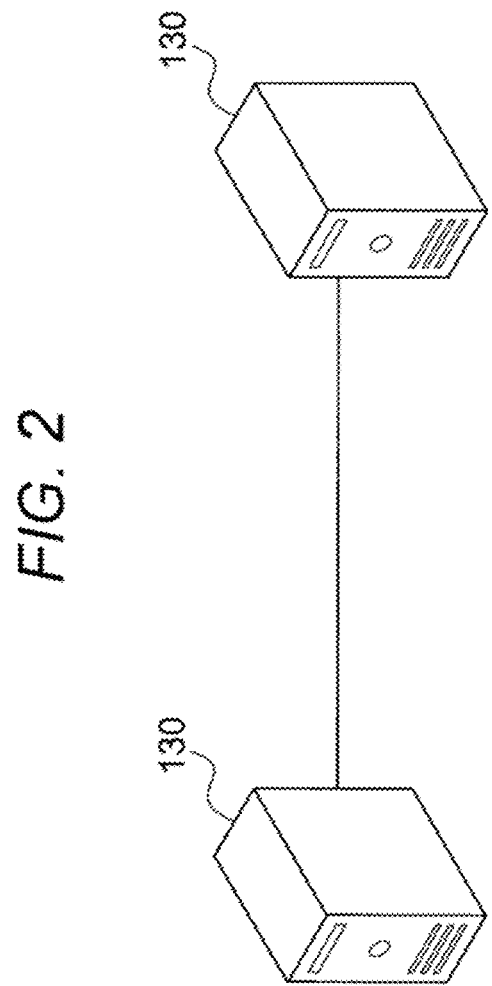
FIG. 2 is a diagram illustrating a network configuration to which autonomous decision-making can be applied.

Autonomous Decision-Making
Centralized Decision-Making
Distributed Decision-Making Autonomous decision-making is a decision-making topology in which an entity (the decision-making entity, here the communication control device 130) that makes a decision makes a decision independently from another decision-making entity. The communication control device 130 independently calculates necessary frequency allocation and interference control. For example, in a case where a plurality of communication control devices 130 is arranged in a distributed manner as illustrated in FIG. 2, autonomous decision-making can be applied.

Figure 3:
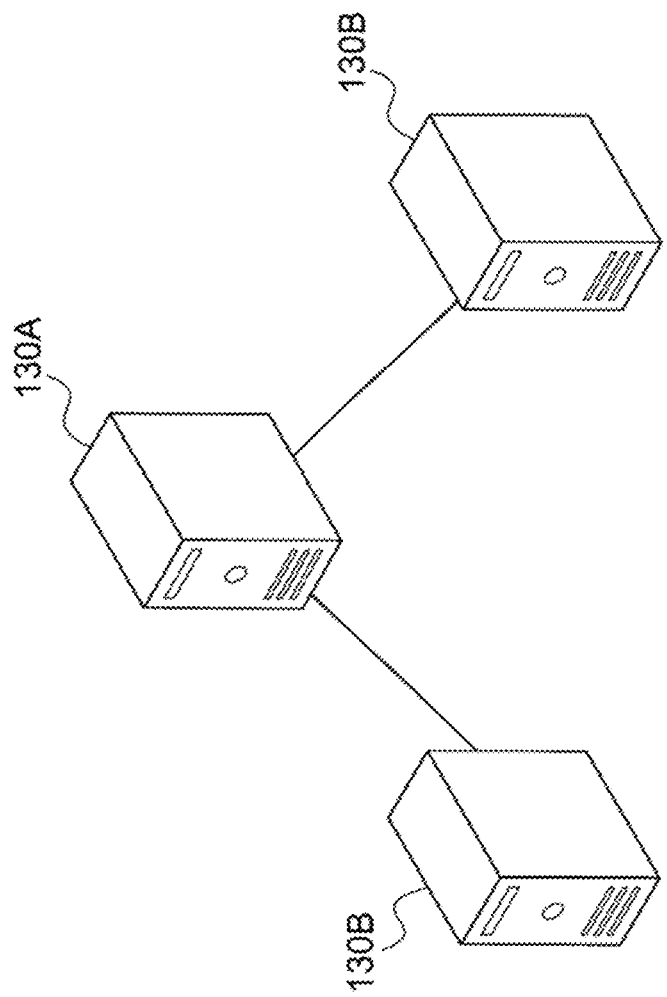
FIG. 3 is a diagram illustrating a network configuration to which centralized decision-making can be applied.

Centralized decision-making is a decision-making topology in which a decision-making entity delegates decision-making to another decision-making entity. In a case where centralized decision-making is performed, for example, a model as illustrated in FIG. 3 is assumed. FIG. 3 illustrates a model (so-called master-slave type) in which one communication control device 130 centrally controls a plurality of communication control devices 130. In the model of FIG. 3, the communication control device 130A, which is the master, can control the communication control devices 130B, which are the plurality of slaves, to intensively make decisions.

Distributed decision-making is a decision-making topology in which a decision-making entity makes a decision in cooperation with another decision-making entity. For example, although a plurality of communication control devices 130 independently make a decision as in autonomous decision-making in FIG. 2, mutual adjustment of decision-making results, negotiation, and the like performed by each communication control device 130 after making a decision may correspond to "distributed decision-making". Furthermore, for example, in the centralized decision-making in FIG. 3, for the purpose of load balancing or the like, the master communication control device 130A, for example, dynamically delegates or discards the decision-making authority to each of the slave communication control device 130B can also be regarded as "distributed decision-making".

Figure 4:
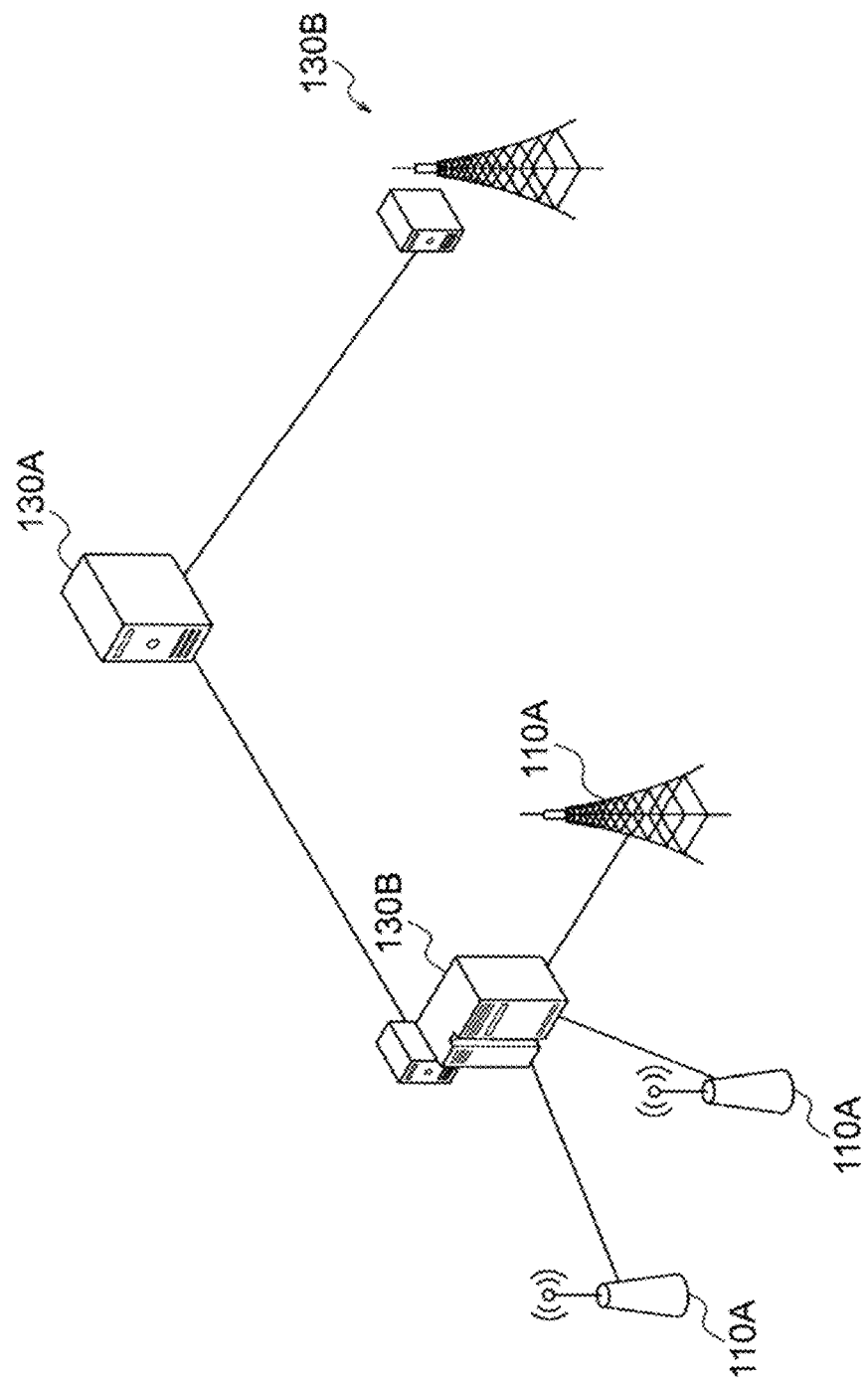
FIG. 4 is a diagram illustrating a network configuration in a case where both centralized decision-making and distributed decision-making are applied.

Both centralized decision-making and distributed decision-making may be applied. In FIG. 4, the slave communication control device 130B operates as an intermediate device that bundles the plurality of communication devices 110. The master communication control device 130A may not control the communication device 110 bundled by the slave communication control device 130B, that is, the secondary system configured by the slave communication control device 130B. As described above, as a modification, implementation as illustrated in FIG. 4 is also possible.

The communication control device 130 may also obtain necessary information from entities other than the communication device 110 and the terminal 120 of the communication network 100 for its role. Specifically, for example, information necessary for protecting the primary system can be acquired from a database (regulatory database) managed or operated by a national regulatory authority (NRA) of a country or a region. Examples of the regulatory database include the Universal Licensing System (ULS) operated by the Federal Communications Commission (FCC) or the like. Examples of information necessary for protecting the primary system include primary system location information, primary system communication parameters, out-of-band emission limit (OOBE), adjacent channel leakage ratio (ACLR), adjacent channel selectivity, fading margin, protection ratio (PR), and the like. In an area where a fixed numerical value, an acquisition method, a derivation method, and the like are defined by a law or the like in order to protect the primary system, it is desirable to use information defined by the law as information necessary for protecting the primary system.

In addition, a database that records the communication device 110 and the terminal 120 that have been subjected to conformity authentication, such as an equipment authorization system (EAS) managed by an office of engineering and technology (OET) of the FCC, also corresponds to the regulatory database. From such a regulatory database, information related to the operable frequency of the communication device 110 and the terminal 120, information related to the maximum EIRP, and the like can be acquired. Naturally, the communication control device 130 may use these pieces of information for protecting the primary system.

Furthermore, it is also conceivable that the communication control device 130 acquires radio wave sensing information from a radio wave sensing system installed and operated for the purpose of radio wave detection in the primary system. As a specific example, in a CBRS (citizens broadband radio service) in the United States, the communication control device 130 acquires radio wave detection information of an onboard radar as a primary system from a radio wave sensing system called an environmental sensing capability (ESC). Furthermore, in a case where the communication device 110 and the terminal 120 have a sensing function, the communication control device 130 may acquire radio wave detection information of the primary system from these.

The interface between the entities constituting the system model may be wired or wireless. For example, not only a wired line but also a wireless interface that does not depend on frequency sharing may be used as an interface between the communication control device 130 and the communication device 110. Examples of the wireless interface that does not depend on frequency sharing include a wireless communication line provided by a mobile communication operator via a licensed band, Wi-Fi communication using an existing license-exempt band, and the like.

<1.2 Terms Related to Frequency and Sharing>

As described above, the present embodiment will be described assuming a dynamic frequency sharing (Dynamic Spectrum Access) environment. As a representative example of dynamic frequency sharing, a mechanism defined in CBRS of the United States (that is, a mechanism defined in Part 96 Citizens Broadband Radio Service of the FCC Rules of the United States of America:) will be described.

Figure 5:
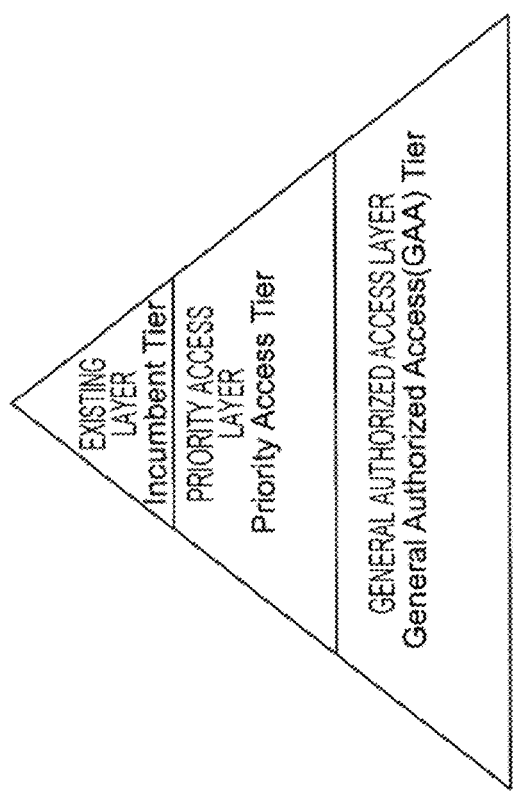
FIG. 5 is a diagram for explaining a three-tier structure in CBRS.

In the CBRS, as illustrated in FIG. 5, each of users in the shared frequency band is classified into one of three groups. This group is called a tier. The three groups are referred to as an incumbent tier (existing layer), a priority access tier (priority access layer), and a general authorized access (GAA) tier (general authorized access layer), respectively.

The incumbent tier is a group including existing users who conventionally use a frequency band defined as a shared frequency band. The existing user is also generally referred to as a primary user. In the CBRS, the department of defense (DOD), fixed satellite operators, and exempted radio broadband licensees (GWBL: Grandfathered Wireless Broadband Licensee) in the United States are defined as existing users. The incumbent tier is not required to avoid interference to the priority access tier and the GAA tier with lower priorities or to suppress usage of the shared frequency band. Also, the incumbent tier is protected from interference by the priority access tier and the GAA tier. That is, the users of the incumbent tier can use the shared frequency band without considering the existence of other groups.

The priority access tier is a group of users who use the shared frequency band on the basis of the above-described priority access license (PAL). A user of the priority access tier is also generally referred to as a secondary user. When the shared frequency band is used, the priority access tier is required to avoid interference and to suppress the use of the shared frequency band for the incumbent tier having a higher priority than the priority access tier. On the other hand, neither interference avoidance nor suppression of use of the shared frequency band is required for the GAA tier having a lower priority than the priority access layer. In addition, the priority access tier is not protected from interference by the incumbent tier with a higher priority, but is protected from interference by the GAA tier with a lower priority.

The GAA tier is a group including shared frequency band users that do not belong to the incumbent tier and the priority access tier. Similarly to the priority access tier, in general, a user of the GAA tier is also referred to as a secondary user. However, since the priority of shared use is lower than that of the priority access tier, it is also referred to as a low priority secondary user. When the shared frequency band is used, the GAA tier is required to avoid interference and suppress the use of the shared frequency band with respect to the incumbent tier and the priority access tier having higher priorities. Also, the GAA tier is not protected from interference by the Incumbent and priority access tiers with higher priority. That is, the GAA tier is a tier that is required to use an opportunistic shared frequency band in law.

Although the CBRS mechanism has been described above as a representative example of dynamic frequency sharing, the present embodiment is not limited to the definition of CBRS. For example, as illustrated in FIG. 5, the CBRS generally adopts a three-tier structure, but a two-tier structure may be adopted in the present embodiment. Typical examples of the two-tier structure include authorized shared access (ASA), licensed shared access (LSA), evolved LSAs (eLSAs), TV band white space (TVWS), and the like. In the ASA, the LSA, and the eLSA, there is no GAA tier, and a structure equivalent to a combination of the incumbent tier and the Priority Access Tier is adopted. In addition, in the TVWS, there is no priority access tier, and a structure equivalent to a combination of the incumbent tier and the GAA tier is adopted. In addition, there may be four or more tiers. Specifically, for example, four or more tiers may be generated by providing a plurality of intermediate layers corresponding to the priority access tiers, giving different priorities to the intermediate layers, and the like. In addition, for example, the tier may be increased by similarly dividing the GAA tier, giving priority, and the like. That is, each group may be divided.

In addition, the primary system of the present embodiment is not limited to the definition of CBRS. For example, as an example of the primary system, a wireless system such as TV broadcasting, a fixed microwave line (fixed system (FS)), a meteorological radar, a radio altimeter, a communications-based train control, and a radio astronomy is assumed, and any wireless system can be the primary system of the present embodiment without being limited thereto.

In addition, as described above, the present embodiment is not limited to the environment of frequency sharing. In general, in frequency sharing or frequency secondary usage, an existing system that uses a target frequency band is referred to as a primary system, and a secondary user is referred to as a secondary system. However, in a case where the present embodiment is applied to an environment other than a frequency sharing environment, the system should be read by replacing the system with another term. For example, a macrocell base station in a heterogeneous network (HetNet) may be a primary system, and a small cell base station or a relay station may be a secondary system. In addition, the base station may be a primary system, and a relay user equipment (UE) or a vehicle UE that implements D2D or V2X existing in its coverage may be a secondary system. The base station is not limited to a fixed type, and may be a portable type or a mobile type. In such a case, for example, the communication control device 130 of the present embodiment may be included in a core network, a base station, a relay station, a relay UE, or the like.

Further, in a case where the present embodiment is applied to an environment other than the frequency sharing environment, the term "frequency" in the present disclosure is replaced with another term shared by the application destination. For example, terms such as "resource", "resource block", "resource element", "resource pool", "channel", "component carrier", "carrier", "subcarrier", and "Bandwidth Part (BWP)" or another term having a meaning equivalent or similar thereto are assumed to be used.

<<2. Description of Various Procedures Assumed in present embodiment>>

Here, a basic procedure that can be used in the implementation of the present embodiment will be described. Note that up to <2.5> described later will be described on the assumption that the processing is mainly performed in the communication device 110A.

<2.1 Registration Procedure>

The registration procedure is a procedure for registering information of a radio system that intends to use the shared frequency band. More specifically, it is a procedure for registering a device parameter related to the communication device 110 of the radio system in the communication control device 130. Typically, a registration procedure is started when the communication device 110 representing a wireless system that intends to use the shared frequency band notifies the communication control device 130 of a registration request including a device parameter. Note that, in a case where a plurality of communication devices 110 belongs to a wireless system that intends to use the shared frequency band, the device parameter of each of the plurality of communication devices is included in the registration request. Furthermore, a device that transmits the registration request as a representative of the wireless system may be appropriately determined.

<2.1.1 Details of Required Parameters>

The device parameter refers to, for example, the following information.

- Information regarding the user of the communication device 110 (hereinafter, it is described as user information)
- Information unique to the communication device 110 (hereinafter, it is described as unique information)
- Information regarding the position of the communication device 110 (hereinafter, described as position information)
- Information regarding an antenna included in the communication device 110 (hereinafter, referred to as antenna information)
- Information regarding the wireless interface included in the communication device 110 (hereinafter, it is described as wireless interface information)
- Legal information related to communication device 110 (hereinafter, it is described as legal information)
- Information regarding the installer of the communication device 110 (hereinafter, it is described as installer information)
- Information regarding the group to which the communication device 110 belongs (hereinafter, it is described as group information)

The device parameter is not limited to the above. Information other than these may be treated as device parameters. Note that the device parameter does not need to be transmitted once, and may be transmitted a plurality of times. That is, a plurality of registration requests may be transmitted for one registration procedure. In this manner, one procedure or one process in one procedure may be performed a plurality of times. The similar applies to the procedure described below.

The user information is information related to the user of the communication device 110. For example, a user ID, an account name, a user name, a user contact, a call sign, and the like can be assumed. The user ID and the account name may be independently generated by the user of the communication device 110 or may be issued in advance by the communication control device 130. As the call sign, it is desirable to use a call sign issued by an NRA.

The user information can be used, for example, for interference resolution. As a specific example, in the frequency use notification procedure described in <2.5> to be described later, even if the communication control device 130 makes the use stop determination on the frequency being used by the communication device 110 and gives an instruction based on the use stop determination, there may be a case where the frequency use notification request of the frequency is continuously notified. In this case, the communication control device 130 can make a contact to the user contact address included in the user information in order to check the behavior of the communication device 110 while being suspicious of a malfunction of the communication device 110. Without being limited to this example, in a case where it is determined that the communication device 110 is performing an operation against the communication control performed by the communication control device 130, the communication control device 130 can make a contact using the user information.

The unique information is information that can identify the communication device 110, product information of the communication device 110, information related to hardware or software of the communication device 110, and the like.

The information that can identify the communication device 110 can include, for example, a manufacturing number (serial number) of the communication device 110, an ID of the communication device 110, and the like. The ID of the communication device 110 may be uniquely assigned by the user of the communication device 110, for example.

The product information of the communication device 110 may include, for example, an authentication ID, a product model number, information related to a manufacturer, and the like. The authentication ID is, for example, an ID given from a certificate authority in each country or region, such as an FCC ID in the United States, a CE number in Europe, and a technical standard conformity certificate (technical standard) in Japan. An ID issued by an industry association or the like on the basis of a unique authentication program may also be regarded as the authentication ID.

The unique information represented by these can be used, for example, in the application of a whitelist or a blacklist. For example, in a case where any piece of information related to the communication device 110 in operation is included in the blacklist, the communication control device 130 can instruct the communication device 110 to stop using the frequency in the frequency use notification procedure described in <2.5> described later. Furthermore, the communication control device 130 can take a behavior of not canceling the usage stop measure until the communication device 110 is cancelled from the blacklist. Furthermore, for example, the communication control device 130 can reject registration of the communication device 110 included in the blacklist. Furthermore, for example, the communication control device 130 can also perform an operation of not considering the communication device 110 corresponding to the information included in the blacklist in the interference calculation of the present disclosure or considering only the communication device 110 corresponding to the information included in the whitelist in the interference calculation.

The information related to the hardware of the communication device 110 may include, for example, transmission power class information. For example, in FCC C.F.R. (Code of Federal Regulations) Part 96 of the United States, two types of classes Category A and Category B are defined as the transmission power class information, and the information related to the hardware of the communication device 110 conforming to the definition can include information indicating which of the two types of classes the information belongs to. In addition, in TS (Technical Specification) 36.104 and T538.104 of 3rd Generation Partnership Project (3GPP), some classes of eNodeB and gNodeB are defined, and these definitions can also be used.

The transmission power class information may be used, for example, in an application of interference calculation. The interference calculation can be performed using the maximum transmission power defined for each class as the transmission power of the communication device 110.

The information related to the software of the communication device 110 can include, for example, version information, a build number, and the like regarding an execution program in which processing necessary for interaction with the communication control device 130 is described. In addition, version information, a build number, and the like of software for operating as the communication device 110 may also be included.

The position information is typically information capable of specifying the position of the communication device 110. For example, the coordinate information is coordinate information acquired by a positioning function represented by a global positioning system (GPS), Beidou, a quasi-zenith satellite system (QZSS), Galileo, or an assisted global positioning system (A-GPS). Typically, information related to latitude, longitude, ground level/sea level, altitude, and positioning error may be included. Alternatively, for example, the position information may be position information registered in an information management device managed by a national regulatory authority (NRA) or its agency. Alternatively, for example, coordinates of an X axis, a Y axis, and a Z axis with a specific geographical position as an origin may be used. In addition, together with such coordinate information, an identifier indicating whether the communication device 110 exists outdoors or indoors may be given.

Furthermore, the position information may be information indicating an area in which the communication device 110 is located. For example, information indicating an area determined by the government, such as a postal code or an address, may be used. Furthermore, for example, the area may be indicated by a set of three or more geographic coordinates. The information indicating these regions may be provided together with the coordinate information.

Furthermore, in a case where the communication device 110 is located indoors, information indicating a floor of a building where the communication device 110 is located can also be included in the position information. For example, an identifier or the like indicating the number of floors, the ground, or the underground may be included in the location information. Furthermore, for example, information indicating a further closed space inside a building, such as a room number and a room name in the building, can be included in the position information.

Typically, the positioning function is desirably provided by the communication device 110. However, the performance of the location positioning function may not meet the required accuracy. In addition, even if the performance of the positioning function satisfies the required accuracy, the position information that satisfies the required accuracy may not necessarily be acquired depending on the installation position of the communication device 110. Therefore, a device different from the communication device 110 may include the positioning function, and the communication device 110 may acquire information related to the position from the device. The device having the positioning function may be an available existing device, or may be provided by an installer of the communication device 110. In such a case, it is desirable that the position information measured by the installer of the communication device 110 is written in the communication device 110.

The antenna information is typically information indicating performance, a configuration, and the like of an antenna included in the communication device 110. Typically, information such as an antenna installation height, a tilt angle (downtilt), a horizontal orientation (azimuth), a boresight, an antenna peak gain, and an antenna model may be included.

Further, the antenna information may also include information related to a formable beam. For example, information such as a beam width, a beam pattern, and an analog or digital beamforming capability may be included.

Further, the antenna information may also include information related to performance and configuration of MIMO (Multiple Input Multiple Output) communication. For example, information such as the number of antenna elements and the maximum number of spatial streams may be included. In addition, codebook information to be used, weight matrix information, and the like may also be included. The weight matrix information includes a unitary matrix, a ZF (Zero-Forcing) matrix, a MMSE (Minimum Mean Square Error) matrix, and the like, which are obtained by SVD (Singular Value Decomposition), EVD (Eigen Value Decomposition), BD (Block Diagonalization), and the like. Furthermore, in a case where the communication device 110 includes a function such as maximum likelihood detection (MLD) that requires nonlinear calculation, information indicating the included function may be included in the antenna information.

Furthermore, the antenna information may include ZoD (Zenith of Direction, Departure). ZoD is a type of radio wave arrival angle. Note that, instead of being notified from the communication device 110, ZoD may be estimated and notified by another communication device 110 from radio waves radiated from the antenna of the communication device 110. In this case, the communication device 110 may be a device that operates as a base station or an access point, a device that performs D2D communication, a moving relay base station, or the like. ZoD may be estimated by a radio wave direction of arrival estimation technology such as MUSIC (Multiple Signal Classification) or ESPRIT (Estimation of Signal Propagation via Rotation Invariance Techniques). Furthermore, ZoD can be used by the communication control device 130 as measurement information.

The wireless interface information is typically information indicating a wireless interface technology included in the communication device 110. For example, identifier information indicating a technology used in GSM, CDMA 2000, UMTS, E-UTRA, E-UTRA NB-IoT, 5G NR, 5G NR NB-IoT or a further next generation cellular system may be included as the radio interface information. Also, identifier information indicating a derivative technology based on Long Term Evolution (LTE)/5G such as MulteFire, Long Term Evolution-Unlicensed (LTE-U), or NR-Unlicensed (NR-U) may be included. In addition, identifier information indicating a standard technology such as a metropolitan area network (MAN) such as WiMAX or WiMAX2+ or a wireless LAN of the IEEE 802.11 series may also be included. Further, the identifier information may be identifier information indicating an extended global platform (XGP) or a shared XGP (sXGP). The identifier information may be identifier information of a communications technology for LPWA (Local Power, Wide Area). Further, identifier information indicating a proprietary radio technology may also be included. In addition, a version number or a release number of the technical specification that defines these technologies may also be included as the wireless interface information.

Further, the wireless interface information may also include frequency band information supported by the communication device 110. For example, the frequency band information may be represented by an upper limit frequency, a lower limit frequency, a center frequency, a bandwidth, a 3GPP Operating Band number, a combination of at least two of these, or the like. In addition, one or more pieces of frequency band information may be included in the wireless interface information.

The frequency band information supported by the communication device 110 may further include information indicating capability of a band extension technology such as carrier aggregation (CA) or channel bonding. For example, combinable band information or the like may be included. Furthermore, the carrier aggregation may also include information related to a band to be used as a primary component carrier (PCC) or a secondary component carrier (SCC). Also, the number of component carriers (the number of CCs) that can be aggregated at the same time can be included.

The frequency band information supported by the communication device 110 may further include information indicating a combination of frequency bands supported by the dual connectivity and the multi connectivity. In addition, information of another communication device 110 that cooperatively provides the dual connectivity and the multi connectivity may also be provided. The communication control device 130 may determine the communication control disclosed in the present embodiment in consideration of another communication device 110 having a cooperative relationship or the like in the subsequent procedures.

The frequency band information supported by the communication device 110 may also include information indicating radio wave use priority such as PAL and GAA.

Furthermore, the wireless interface information may also include modulation scheme information supported by the communication device 110. For example, as a representative example, information indicating a primary modulation scheme such as frequency shift keying (FSK), n-value PSK (Phase Shift Keying, where n is a multiplier of 2, such as 2, 4, 8, and the like), and n-value QAM (Quadrature Amplitude Modulation, where n is a multiplier of 4, such as 4, 16, 64, 256, 1024) can be included. Furthermore, information indicating a secondary modulation scheme such as orthogonal frequency division multiplexing (Orthogonal Frequency Division Multiplexing), scalable OFDM, DFT-s-OFDM (DFT spread OFDM), GFDM (Generalized Frequency Division Multiplexing), and filter bank multi carrier (FBMC) may be included.

Furthermore, the wireless interface information may also include information related to an error correction code. For example, capabilities such as a turbo code, a low density parity check (LDPC) code, a polar code, and an erasure correction code, and coding rate information to be applied can be included.

The modulation scheme information and the information related to the error correction code can also be expressed by a modulation and coding scheme (MCS) index as another aspect.

Furthermore, the wireless interface information may also include information indicating a function specific to each wireless technical specification supported by the communication device 110. For example, as a representative example, there is Transmission Mode (TM) information defined in LTE. In addition, those having two or more modes for a specific function can be included in the wireless interface information such as TM information. Furthermore, in the technical specification, in a case where the communication device 110 supports a function that is not essential in the specification even if there are not two or more modes, information indicating the supported function can also be included.

Furthermore, the radio interface information may also include radio access technology (RAT) information supported by the communication device 110. For example, information indicating TDMA (Time Division Multiple Access), FDMA (Frequency Division Multiple Access), OFDMA (Orthogonal Frequency Division Multiple Access), PDMA (Power Division Multiple Access), CDMA (Code Division Multiple Access), SCMA (Sparse Code Multiple Access), IDMA (Interleave Division Multiple Access), SDMA (Spatial Division Multiple Access), CSMA/CA (Carrier Sense Multiple Access/Collision Avoidance), CSMA/CD (Carrier Sense Multiple Access/Collision Detection), or the like may be included. Note that, TDMA, FDMA, and OFDMA are classified into orthogonal multiple access (OMA). PDMA, CDMA, SCMA, IDMA, and SDMA are classified into non-orthogonal multiple access (NOMA). A representative example of the PDMA is a method implemented by a combination of Superposition Coding (SPC) and Successive Interference Canceller (SIC). CSMA/CA and CSMA/CD are classified into opportunistic access.

In a case where the wireless interface information includes information indicating an opportunistic connection method, information indicating details of the access method may be further included. As a specific example, information indicating which of Frame Based Equipment (FBE) and Load Based Equipment (LBE) defined in EN 301 598 of ETSI is included.

In a case where the radio interface information indicates the LBE, the radio interface information may further include LBE specific information such as a priority class specified in EN 301 598 of ETSI.

In addition, the wireless interface information may also include information related to a duplex mode supported by the communication device 110. As a representative example, for example, information related to a method such as frequency division duplex (FDD), time division duplex (TDD), or full duplex (FD) may be included.

In a case where TDD is included as the wireless interface information, TDD frame structure information used or supported by the communication device 110 may be added. In addition, information related to the duplex mode may be included for each frequency band indicated by the frequency band information.

In a case where the FD is included as the wireless interface information, information related to an interference power detection level may be included.

Furthermore, the wireless interface information may also include information regarding a transmission diversity method supported by the communication device 110. For example, space time coding (STC) or the like may be included.

Furthermore, the radio interface information may also include guard band information. For example, the wireless interface may include information related to a predetermined guard band size. Alternatively, for example, information related to a guard band size desired by the communication device 110 may be included.

Regardless of the foregoing aspects, the radio interface information may be provided for each frequency band.

The legal information is typically information related to regulations that the communication device 110 must comply with, defined by a radio administration agency or an equivalent agency in each country or region, authentication information acquired by the communication device 110, or the like. Typically, the information related to the regulation may include, for example, upper limit value information of out-of-band radiation, information related to a blocking characteristic of the receiver, and the like. Typically, the authentication information can include, for example, type approval information, legal/regulatory information serving as a reference of authentication acquisition, and the like. The type authentication information corresponds to, for example, FCC ID of the United States, technical standard conformity certification of Japan, and the like. The legal/regulatory information corresponds to, for example, an FCC regulation number of the United States, an ETSI Harmonized Standard number of Europe, and the like.

Among the legal information, regarding numerical values, those defined in the specification of the wireless interface technology may be substituted. The standard specification of the radio interface technology corresponds to, for example, 3GPP T536.104, T538.104, or the like. Adjacent channel leakage ratio (ACLR) is defined therein. Instead of the upper limit information of the out-of-band radiation, the upper limit of the out-of-band radiation may be derived and used using the ACLR defined in the specification. In addition, the ACLR itself may be used as necessary. Further, adjacent channel selectivity (ACS) may be used instead of the blocking characteristic. In addition, these may be used in combination, or an adjacent channel interference ratio (ACIR) may be used. Note that, in general, ACIR has the following relationship with ACLR and ACS.

[Math. 1]

$$ACIR = \left(\frac{1}{ACS} + \frac{1}{ACLR}\right)^{-1} \quad (1)$$

Note that, although Equation (1) uses true value expression, Equation (1) may be expressed by logarithmic expression.

The installer information may include information capable of specifying a person (installer) who installs the communication device 110, unique information associated with the installer, and the like. Typically, the installer information may include information related to a person who is responsible for the location information of the communication device 110, such as a certified professional installer (CPI) defined in Non-Patent Document 3. CPI discloses CPIR-ID (Authorized Professional Installation Registration ID) and CPI name. In addition, as unique information associated with the CPI, for example, a contact address (Mailing address or Contact address), an e-mail address, a telephone number, a public key identifier (PKI), and the like are disclosed. The present invention is not limited thereto, and other information related to the installer may be included in the installer information as necessary.

The group information may include information related to the communication device group to which the communication device 110 belongs. Specifically, for example, information related to the same or equivalent type of group as disclosed in WINNF-SSC-0010 may be included. Furthermore, for example, in a case where the communication operator manages the communication devices 110 in units of groups according to its own operation policy, information related to the groups can be included in the group information.

The information listed so far may be estimated by the communication control device 130 from other information provided from the communication device 110 without the communication device 110 providing the information to the communication control device 130. Specifically, for example, the guard band information can be estimated from the radio interface information. When the radio interface used by the communication device 110 is E-UTRA or 5G NR, it can be estimated on the basis of the E-UTRA transmission bandwidth specification described in T536.104 of 3GPP, the 5G NR transmission bandwidth specification described in T538.104 of 3GPP, and a table described in T538.104 described below.

TABLE 1

Table 5.6-1: Transmission bandwidth configuration
NRB in E-UTRA channel bandwidths (cited
from Table 5.6-1 in TS36.104 of 3GPP)

| Channel bandwidth $BW_{Channel}$ [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

TABLE 2

Table 5.3.3-1: Minimum guardband (kHz) (FR1) (cited from Table 5.3.3-1 in TS38.104 of 3GPP)

| SCS (kHz) | 5 MHz | 10 MHz | 15 MHz | 20 MHz | 25 MHz | 30 MHz | 40 MHz | 50 MHz | 60 MHz | 70 MHz | 80 MHz | 90 MHz | 100 MHz |
|---|---|---|---|---|---|---|---|---|---|---|---|---|---|
| 15 | 242.5 | 312.5 | 382.5 | 452.5 | 522.5 | 592.5 | 552.5 | 692.5 | N.A | N.A | N.A | N.A | N.A |
| 30 | 505 | 665 | 645 | 805 | 785 | 946 | 905 | 1045 | 825 | 965 | 925 | 885 | 845 |
| 60 | N.A | 1010 | 990 | 1330 | 1310 | 1290 | 1610 | 1570 | 1530 | 1490 | 1450 | 1410 | 1370 |

TABLE 3

Table 5.3.3-2: Minimum guardband (kHz) (FR2) (cited from Table 5.3.3-2 in TS38.104 of 3GPP)

| SCS (kHz) | 50 MHz | 100 MHz | 200 MHz | 400 MHz |
|---|---|---|---|---|
| 60 | 1210 | 2450 | 4930 | N.A |
| 120 | 1900 | 2420 | 4900 | 9860 |

TABLE 4

Table 5.3.3-3: Minimum guardband (kHz) of SCS 240 kHz SS/PBCH block (FR2) (cited from Table 5.3.3-3 in TS38.104 of 3GPP)

| SCS (kHz) | 100 MHz | 200 MHz | 400 MHz |
|---|---|---|---|
| 240 | 3800 | 7720 | 15560 |

In other words, it is sufficient that the communication control device 130 can acquire the information listed so far, and the communication device 110 is not necessarily required to provide the information to the communication control device 130. Furthermore, the intermediate device 130B (for example, a network manager) that bundles the plurality of communication devices 110 does not need to provide the information to the communication control device 130A. That the communication device 110 or the intermediate device 130B provides information to the communication control device 130 or 130A is merely one means of information provision in the present embodiment. The information listed so far means information that can be necessary for the communication control device 130 to normally complete this procedure, and means for providing the information does not matter.

<2.1.1.1 Supplement of Required Parameters>

In the registration procedure, in some cases, it is assumed that not only the communication device 110 but also the device parameters related to the terminal 120 are required to be registered in the communication control device 130. In such a case, the term "communication device" in the description given in <2.1.1> may be replaced with a term "terminal" or a similar term. In addition, a parameter specific to "terminal" that is not described in <2.1.1> may also be treated as a required parameter in the registration procedure. For example, a user equipment (UE) category specified in 3GPP or the like can be cited. <2.1.2 Details of registration processing>

As described above, the communication device 110) representing the wireless system that intends to use the shared frequency band generates a registration request including the device parameter and notifies the registration request to the communication control device 130.

Here, in a case where the installer information is included in the device parameters, the communication device 110 may perform tamper-proof processing or the like on the registration request using the installer information. In addition, a part or the entire part of the information included in the registration request may be subjected to encryption processing. Specifically, for example, a unique public key may be shared in advance between the communication device 110 and the communication control device 130, and the communication device 110 may encrypt information using a secret key corresponding to the public key. Examples of the encryption target include security sensitive information such as position information.

Note that the ID and the position information of the communication device 110 may be disclosed, and the communication control device 130 may hold in advance the ID and the position information of the main communication device 110 existing in its coverage. In such a case, since the communication control device 130 can acquire the position information from the ID of the communication device 110 that has transmitted the registration request, the position information does not need to be included in the registration request. Furthermore, it is also conceivable that the communication control device 130 returns a necessary device parameter to the communication device 110 that has transmitted the registration request, and in response to this, the communication device 110 transmits a registration request including the device parameter necessary for registration. In this manner, the information included in the registration request may be different depending on the case.

After receiving the registration request, the communication control device 130 performs registration processing of the communication device 110 and returns a registration response according to a processing result. If there is no shortage or abnormality of information necessary for registration, the communication control device 130 records the information in an internal or external storage device and notifies normal completion. Otherwise, a registration failure is notified. In a case where the registration is normally completed, the communication control device 130 may allocate an ID to each of the communication devices 110 and notify the communication devices of the ID information at the time of response. In a case where the registration fails, the communication device 110 may notify the corrected registration request again. Furthermore, the communication device 110 may change the registration request and try the registration procedure until the normal completion of the process.

Note that the registration procedure may be executed even after the registration is normally completed. Specifically, for example, the registration procedure can be re-executed in a case where the position information is changed beyond a predetermined standard due to movement/accuracy improvement or the like. The predetermined standard is typically determined by the legal system in each country or region. For example, in 47C.F.R. Part 15 in the United States, in a case where the position of a device using Mode II personal/portable white space device, that is, a device using a free frequency changes by 100 meters or more, the device is required to perform registration again.

<2.2 Available Frequency Information Query procedure (Available spectrum query procedure)>

The available frequency information query procedure is a procedure in which a wireless system that intends to use a shared frequency band inquires of the communication control device 130 about information regarding an available frequency. Note that the available frequency information query procedure does not necessarily need to be performed. Furthermore, the communication device 110 that makes a query on behalf of the wireless system that intends to use the shared frequency band may be the same as or different from the communication device 110 that has generated the registration request. Typically, the communication device 110 that makes a query notifies the communication control device 130 of a query request including information that can identify the communication device 110, whereby the procedure is started.

Here, typically, the available frequency information is information indicating a frequency at which the communication device 110 does not give fatal interference to the primary system and secondary use can be safely performed.

The available frequency information is determined, for example, on the basis of a secondary use prohibited area called an exclusion zone. Specifically, for example, in a case where the communication device 110 is installed in the secondary use prohibited area provided for the purpose of protecting the primary system using the frequency channel Fl, the communication device 110 is not notified of the frequency channel Fl as an available channel.

The available frequency information may also be determined, for example, by the degree of interference to the primary system. Specifically, for example, in a case where it is determined that the critical interference is given to the primary system even outside the secondary usage prohibited area, the frequency channel may not be notified as an available channel. An example of a specific calculation method is described in <2.2.2> described later.

Also, as described above, there may be frequency channels that are not signaled as available due to conditions other than primary system protection requirements. Specifically, for example, in order to avoid interference that may occur between the communication devices 110 in advance, a frequency channel being used by another communication device 110 existing in the vicinity of the communication device 110 may not be notified as an available channel. In this manner, the available frequency information set in consideration of interference with the other communication device 110 may be set as, for example, "recommended use frequency information" and provided together with the available frequency information. That is, the "recommended use frequency information" is desirably a subset of the available frequency information.

Even in the case of affecting the primary system, if the influence can be avoided by reducing the transmission power, the same frequency as that of the primary system or the neighboring communication device 110 may be notified as an available channel. In such a case, typically, the maximum allowable transmission power information is included in the available frequency information. The maximum allowable transmission power is typically expressed by equivalent isotropic radiated power (EIRP). The present invention is not necessarily limited to this, and may be provided by, for example, a combination of antenna power (conducted power) and antenna gain. Furthermore, the antenna gain may be set to an allowable peak gain for each spatial direction.

<2.2.1 Details of Required Parameters>

As the information that can specify the radio system that intends to use the shared frequency band, for example, unique information registered at the time of the registration procedure, the above-described ID information, and the like can be assumed.

Furthermore, the query request may also include query requirement information. The query requirement information may include, for example, information indicating a frequency band for which it is desired to know whether or not the frequency band is available. Also, for example, transmission power information may be included. The communication device 110 that makes a query can include transmission power information, for example, in a case where it is desired to know only frequency information in which desired transmission power can be used. The query requirement information does not necessarily need to be included in the query request.

Furthermore, the query request may also include a measurement report. The measurement report includes a result of measurement performed by the communication device 110 and/or the terminal 120. Some or all of the measurement results may be represented by raw data or may be represented by processed data. For example, standardized metrics represented by reference signal received power (RSRP), reference signal strength indicator (RSSI), and reference signal received quality (RSRQ) may be used for measurement.

<2.2.2 Details of Available Frequency Evaluation processing>

After receiving the query request, the available frequency is evaluated on the basis of the query requirement information. For example, as described above, the available frequency can be evaluated in consideration of the existence of the primary system, the secondary use prohibited area thereof, and the communication device 110 in the vicinity thereof.

Maximum allowable transmission power information may be derived. Typically, the maximum allowable transmission power information is calculated using allowable interference power information in the primary system or a protection zone thereof, location information of a reference point that calculates an interference power level suffered by the primary system, registration information of the communication device 110, and a propagation loss estimation model. Specifically, as an example, it is calculated by the following mathematical expression.

[Math.2]

$$P_{MaxTx(dBm)} = 1_{Th(dBm)} + PL(d)_{(dB)} \quad (2$$

Here, $P_{MaxTx(dBm)}$ is maximum allowable transmission power, $I_{Th(dBm)}$ is allowable interference power (limit value of allowable interference power), d is a distance between a predetermined reference point and the communication device 110, and $PL(d)_{(dB)}$ is a propagation loss at the distance d. In Equation (2), the antenna gain in the transceiver is not included, but the antenna gain in the transceiver may be included according to the maximum allowable transmission power expression method (EIRP, conducted power, and the like) or the reception power reference point (Antenna input point, antenna output point, and the like). In addition, feeder loss may be considered as necessary. The present embodiment is applied, for example, when deriving the maximum allowable transmission power information. Details will be described later.

In addition, Equation (2) is described on the basis of the assumption that a single communication device 110 is an interference source (single station interference). For example, in a case where it is necessary to consider aggregated interference from a plurality of communication devices 110 at the same time, a correction value may be added. Specifically, for example, the correction value can be determined on the basis of three (Fixed/Predetermined, Flexible, Flexible Minimized) interference margin methods disclosed in Non-Patent Document 4 (ECC Report 186).

Note that the allowable interference power information itself is not necessarily directly available as in Expression (2). For example, in a case where a required signal power-to-interference power ratio (SIR), a signal to interference plus noise ratio (SINR), an interference-to-noise ratio (INR), and the like of the primary system are available, they may be converted into allowable interference power and used. Note that such conversion processing is not limited to this processing, and may be applied to processing of other procedures.

Note that, although Equation (2) is expressed using logarithms, it is a matter of course that Equation (2) may be converted into a true number and used at the time of implementation. In addition, all parameters in logarithmic notation described in the present disclosure may be appropriately converted into true numbers and used.

Further, in a case where the foregoing transmission power information is included in the query requirement information, the available frequency can be evaluated by a method different from the foregoing method. Specifically, for example, in a case where it is assumed that desired transmission power indicated by transmission power information is used, when an estimated amount of interference is less than allowable interference power in the primary system or a protection zone thereof, it is determined that the frequency channel is available, and the communication device 110 is notified of the frequency channel.

Furthermore, for example, in a case where an area or a space in which the communication device 110 can use the shared frequency band is determined in advance, similarly to an area of a radio environment map (REM), the available frequency information may be simply derived on the basis of only coordinates (coordinates or latitude, longitude, and ground level of X-axis, Y-axis, and Z-axis of communication device 110) included in the position information of the communication device 110. Furthermore, for example, even in a case where a lookup table that associates coordinates of a position of the communication device 110 with available frequency information is prepared, the above-described available frequency information may be derived on the basis of only the position information of the communication device 110. As described above, there are various methods for determining the available frequency, and the method is not limited to the example of the present disclosure.

Furthermore, in a case where the communication control device 130 acquires information related to capability of a band extension technology such as carrier aggregation (CA) or channel bonding as the frequency band information supported by the communication device 110, the communication control device 130 may include an available combination, a recommended combination, or the like thereof in the available frequency information.

Furthermore, in a case where the communication control device 130 acquires information related to a combination of frequency bands supported by the dual connectivity and the multi connectivity as the frequency band information supported by the communication device 110, the communication control device 130 may include information such as an available frequency and a recommended frequency in the available frequency information for the dual connectivity and the multi connectivity.

In addition, in a case of providing the available frequency information for the band extension technology as described above, when the imbalance of the maximum allowable transmission power occurs between the plurality of frequency channels, the available frequency information may be provided after adjusting the maximum allowable transmission power of each frequency channel. For example, from a perspective of primary system protection, the maximum allowable transmission power of each frequency channel may be aligned with the maximum allowable transmission power of a frequency channel having a low maximum allowable power spectral density (PSD).

The evaluation of the available frequency does not necessarily need to be performed after the query request is received. For example, after the normal completion of the above-described registration procedure, the communication control device 130 may independently perform the procedure without a query request. In such a case, an REM, a lookup table, or an information table similar to those described above as an example may be created.

Furthermore, the radio wave use priority such as PAL or GAA may also be evaluated. For example, in a case where the registered device parameter or the query requirement includes the information related to the priority of the radio wave use, it may be determined whether the frequency use is possible on the basis of the priority, and the notification may be made. Furthermore, for example, as disclosed in Non-Patent Document 3, in a case where information (in Non-Patent Document 3, it is referred to as a cluster list) regarding the communication device 110 that performs high priority use (for example, PAL) from the user is registered in the communication control device 130 in advance, evaluation may be performed on the basis of the information.

After the evaluation of the available frequency is completed, the communication control device 130 notifies the communication device 110 of the evaluation result.

The communication device 110 may select a desired communication parameter using the evaluation result received from the communication control device 130.

<2.3 Frequency Use Permission Procedure (Spectrum grant procedure)>

The frequency use permission procedure is a procedure for the wireless system that intends to use the shared frequency band to receive the secondary use permission of the frequency from the communication control device 130. The communication device 110 that performs the frequency use permission procedure as a representative of the wireless system may be the same as or different from the communication device 110 that has performed the procedure so far. Typically, the communication device 110 notifies the communication control device 130 of a frequency use permission request including information that can specify the communication device 110, whereby the procedure is started. Note that, as described above, the available frequency information query procedure is not essential. Therefore, the frequency use permission procedure may be performed next to the available frequency information query procedure, or may be performed next to the registration procedure.

In the present embodiment, it is assumed that at least the following two types of frequency use permission request methods can be used.

Designation method

Flexible method

The designation method is a request method in which the communication device 110 designates a desired communication parameter and requests the communication control device 130 to permit operation based on the desired communication parameter. The desired communication parameter includes, but is not particularly limited to, a frequency channel to be used, a maximum transmission power, and the like. For example, a radio interface technology specific parameter (such as a modulation scheme or a duplex mode) may be specified. In addition, information indicating radio wave use priority such as PAL and GAA may be included.

The flexible method is a request method in which the communication device 110 specifies only a requirement regarding a communication parameter and requests the communication control device 130 to specify a communication parameter that can be permitted for secondary use while satisfying the requirement. Examples of the requirement related to the communication parameter include, for example, but are not particularly limited to, a bandwidth, a desired maximum transmission power, a desired minimum transmission power, or the like. For example, a radio interface technology specific parameter (such as a modulation scheme or a duplex mode) may be specified. Specifically, for example, one or more TDD frame structures may be selected in advance and notified.

Similarly to the query request, the frequency use permission request may also include the measurement report in either the designation method or the flexible method. The measurement report includes a result of measurement performed by the communication device 110 and/or the terminal 120. The measurement may be represented by raw data or processed data. For example, standardized metrics represented by reference signal received power (RSRP), reference signal strength indicator (RSSI), and reference signal received quality (RSRQ) may be used for measurement.

Note that, the scheme information used by the communication device 110 may be registered in the communication control device 130 at the time of the registration procedure described in <2.1>.

<2.3.1 Details of Frequency Use Permission Processing>

After receiving the frequency use permission request, the communication control device 130 performs frequency use permission processing on the basis of the frequency use permission request method. For example, using the method described in <2.2>, it is possible to perform the frequency use permission processing in consideration of the primary system, the secondary use prohibited area, the presence of the communication device 110 in the vicinity, and the like. The present embodiment is applied to, for example, frequency use permission processing. Details will be described later.

In a case where the flexible method is used, the maximum allowable transmission power information may be derived using the method described in <2.2.2>. Typically, the maximum allowable transmission power information is calculated using allowable interference power information in the primary system or a protection zone thereof, location information of a reference point that calculates an interference power level suffered by the primary system, registration information of the communication device 110, and a propagation loss estimation model. Specifically, as an example, it is calculated by Equation (2) described above.

Furthermore, as described above, Equation (2) is described on the basis of the assumption that the single communication device 110 is an interference source. For example, in a case where it is necessary to consider aggregated interference from a plurality of communication devices 110 at the same time, a correction value may be added. Specifically, for example, the correction value can be determined on the basis of three types of methods (Fixed/Predetermined, Flexible, Flexible Minimized) disclosed in Non-Patent Document 4 (ECC Report 186).

The communication control device 130 can use various propagation loss estimation models in a frequency use permission procedure, an available frequency evaluation process for an available frequency information query request, and the like. When a model is designated for each application, it is desirable to use the designated model. For example, in Non-Patent Document 3 (WINNF-TS-0112), a propagation loss model such as Extended Hata (eHATA) or Irregular Terrain Model (ITM) is adopted for each application. Certainly, the propagation loss model is not limited thereto.

There are also propagation loss estimation models that require information related to radio wave propagation paths. The information related to the radio wave propagation path may include, for example, information indicating inside and outside of a line of sight (LOS: Line of Sight and/or NLOS: Non Line of Sight), topographical information (undulations, sea levels, and the like), environmental information (Urban, Suburban, Rural, Open Sky, and the like), and the like. When using the propagation loss estimation model, the communication control device 130 may estimate these pieces of information from the already acquired registration information of the communication device 110 or information of the primary system. Alternatively, in a case where there is a parameter specified in advance, it is desirable to use the parameter.

In a case where the propagation loss estimation model is not designated in a predetermined application, the propagation loss estimation model may be selectively used as necessary. For example, when estimating the interference power to the other communication device 110, a model that is calculated with a small loss such as a free space loss model is used, but when estimating the coverage of the communication device 110, a model that is calculated with a large loss can be used.

In addition, in a case where the designated propagation loss estimation model is used, as an example, the frequency use permission processing can be performed by evaluating the interference risk. Specifically, for example, in a case where it is assumed that desired transmission power indicated by transmission power information is used, when an estimated amount of interference is less than allowable interference power in the primary system or a protection zone thereof, it is determined that use of the frequency channel is permissive, and the communication device 110 is notified of the determination.

In any method of the designation method and the flexible method, similarly to the query request, the radio wave use priority such as PAL or GAA may also be evaluated. For example, in a case where information related to the radio wave use priority is included in the registered device parameter or the query requirement, it may be determined whether or not the frequency use is possible on the basis of the priority, and notification may be performed. Furthermore, for example, in a case where information related to the communication device 110 that performs high priority use (for example, PAL) from the user is registered in the communication control device 130 in advance, evaluation may be performed on the basis of the information. For example, in Non-Patent Document 3 (WINNF-TS-0112), information related to the communication device 110 is referred to as a cluster list.

The frequency use permission processing is not necessarily performed due to the reception of the frequency use permission request. For example, after the normal completion of the above-described registration procedure, the communication control device 130 may independently perform without the frequency use permission request. Furthermore, for example, the frequency use permission processing may be performed at regular intervals. In such a case, the foregoing REM, lookup table, or an information table similar thereto may be created. As a result, since the frequency that can be permitted is determined only by the position information, the communication control device 130 can quickly return a response after receiving the frequency use permission request.

<2.4 Frequency Use Notification (Spectrum Use Notification/Heartbeat)>

The frequency use notification is a procedure in which the wireless system using the shared frequency band notifies the communication control device 130 of the use of the frequency based on the communication parameter allowed to be used in the frequency use permission procedure. The communication device 110 that performs the frequency use notification as a representative of the wireless system may be the same as or different from the communication device 110 that has performed the procedure so far. Typically, the communication device 110 notifies the communication control device 130 of a notification message including information that can identify the communication device 110.

The frequency use notification is desirably performed periodically until the use of the frequency is rejected from the communication control device 130. In that case, the frequency use notification is also referred to as a heartbeat.

After receiving the frequency use notification, the communication control device 130 may determine whether to start or continue the frequency use (in other words, radio wave transmission at the permissible frequency). Examples of the determination method include checking of the frequency use information of the primary system. Specifically, it is possible to determine permission or denial of the start or continuation of the frequency use (radio wave transmission at the permitted frequency) on the basis of a change in the usage frequency of the primary system, a change in the frequency use status of the primary system in which the radio wave use is not steady (for example, an onboard radar of CBRS of the United States of America), and the like. If the start or continuation is permitted, the communication device 110 may start or continue frequency use (radio wave transmission at a permitted frequency).

After receiving the frequency use notification, the communication control device 130 may instruct the communication device 110 to reconfigure (reconfigure) the communication parameters. Typically, in the response of the communication control device 130 to the frequency use notification, the reconfiguration of the communication parameters may be instructed. For example, information related to recommended communication parameters (recommended communication parameter information) may be provided. The communication device 110 to which the recommended communication parameter information has been provided desirably performs the frequency use permission procedure described in <2.4> again using the recommended communication parameter information.

<2.5 Supplement of Various Procedures>

The above procedures do not necessarily need to be implemented individually, as described below. For example, by substituting a third procedure with roles of two different procedures, the two different procedures may be realized. Specifically, for example, the registration request and the available frequency information query request may be integrally notified. Furthermore, for example, the frequency use permission procedure and the frequency use notification may be integrally performed. Of course, it is not limited to these combinations, and three or more procedures may be performed integrally. Furthermore, as described above, one procedure may be separately performed a plurality of times.

In addition, the expression "to acquire" or an expression equivalent thereto in the present disclosure does not necessarily mean to acquire according to the procedure described in the present disclosure. For example, although it is described that the position information of the communication device 110 is used in the available frequency evaluation processing, it means that the information acquired in the registration procedure does not necessarily need to be used, and in a case where the position information is included in the available frequency query procedure request, the position information may be used. In other words, the procedure for acquisition described in the present disclosure is an example, and acquisition by other procedures is also permitted within the scope of the present disclosure and within the scope of technical feasibility.

In addition, the information described to be included in the response from the communication control device 130 to the communication device 110 may be actively notified from the communication control device 130 by the push method if possible. As a specific example, the available frequency information, the recommended communication parameter information, the radio wave transmission continuation rejection notification, and the like may be notified by the push scheme.

<2.6 Various Procedures for Terminal>

So far, the description has been mainly made assuming the processing in the communication device 110A. However, in some embodiments, not only the communication device 110A but also the terminal 120 and the communication device 110B can operate under the management of the communication control device 130. That is, a scenario in which the communication parameter is determined by the communication control device 130 is assumed. Even in such a case, basically, each procedure described in <2.1> to <2.4> can be used. However, unlike the communication device 110A, the terminal 120 and the communication device 110B need to use the frequency managed by the communication control device 130 for the backhaul link, and cannot perform radio wave transmission without permission. Therefore, it is desirable to start backhaul communication for the purpose of accessing the communication control device 130 only after detecting a radio wave or an authorization signal transmitted by the communication device 110A (communication device 110 capable of providing wireless communication service or master communication device 110 of master-slave type).

On the other hand, under the management of the communication control device 130, the terminal or the communication device 110B may also set an allowable communication parameter for the purpose of protecting the primary system. However, the communication control device 130 cannot know the position information and the like of these devices in advance. Furthermore, these devices are also likely to have mobility. That is, the position information is dynamically updated. Depending on the legal system, in a case where the position information changes by a certain amount or more, re-registration to the communication control device 130 may be required in some cases.

In consideration of such various use forms, operation forms, and the like of the terminal 120 and the communication device 110, in the operation form of the TVWS (Non-Patent Document 5) defined by the Office of Communication (Ofcom), the following two types of communication parameters are defined.

Generic Operational Parameters
Specific Operational Parameters

The generic operational parameters are communication parameters defined as "Parameters that can be used by any slave WSD located within the coverage area of a predetermined master WSD (corresponding to the communication device 110)" in Non Patent Document 5. One of the features is that it is calculated by the WSDB without using the position information of the slave WSD.

The generic operational parameters may be provided by unicast or broadcast from the communication device 110 that is already permitted to perform radio wave transmission from the communication control device 130. For example, a broadcast signal represented by a Contact Verification Signal (CVS) specified in Part 15 Subpart H of the FCC rule in the United States may be used. Alternatively, it may be provided by a broadcast signal specific to a radio interface. As a result, the terminal 120 and the communication device 110B can be treated as communication parameters used for radio wave transmission for the purpose of accessing the communication control device 130.

The specific operational parameters are communication parameters defined as "Parameters usable by specific slave WSD (White Space Device)" in Non Patent Document 5. In other words, it is a communication parameter calculated using the device parameter of the slave WSD corresponding to the terminal 120. As a feature, it is calculated by a white space database (WSDB) using the position information of the slave WSD.

<2.7 Procedure Occurring Between Communication Control Devices>

<2.7.1 Information Exchange>

The communication control device 130 can exchange management information with another communication control device 130. At least the following information is desirably exchanged:

Information related to communication device 110
System information to be protected The information related to the communication device 110 includes at least registration information and communication parameter information of the communication device 110 operating under permission of the communication control device 130. Registration information of the communication device 110 having no permitted communication parameter may be included.

The registration information of the communication device 110 is typically a device parameter of the communication device 110 registered in the communication control device 130 in the above-described registration procedure. Not all the registered information is necessarily exchanged. For example, information that may correspond to personal information does not need to be exchanged. Furthermore, when the registration information of the communication device 110 is exchanged, the registration information may be encrypted and exchanged, or the information may be exchanged after the content of the registration information is ambiguous. For example, information converted into a binary value or information signed using an electronic signature mechanism may be exchanged.

The communication parameter information of the communication device 110 is typically information related to a communication parameter currently used by the communication device 110. At least information indicating the use frequency and the transmission power is desirably included. Other communication parameters may be included.

The area information is typically information indicating a predetermined geographical area. The information may include region information of various attributes in various manners.

For example, as in PAL Protection Area (PPA) disclosed in Non-Patent Document 3 (WINNF-TS-0112), protected area information of the communication device 110 serving as a high priority secondary system may be included in the area information. The area information in this case can be expressed by, for example, a set of three or more coordinates indicating the geographical position. Furthermore, for example, in a case where a plurality of communication control devices 130 can refer to a common external database, the area information is expressed by a unique ID, and the actual geographical area can be referred to from the external database using the ID.

Furthermore, for example, information indicating the coverage of the communication device 110 may be included. The area information in this case can also be expressed by, for example, a set of three or more coordinates indicating the geographical position. Furthermore, for example, assuming that the coverage is a circle centered on the geographical position of the communication device 110, the coverage can also be expressed by information indicating the size of the radius. Furthermore, for example, in a case where a plurality of communication control devices 130 can refer to a common external database that records area information, the information indicating the coverage is expressed by a unique ID, and the actual coverage can be referred to from the external database using the ID.

Furthermore, as another aspect, information related to an area section determined in advance by an administration or the like can also be included. Specifically, for example, it is possible to indicate a certain region by indicating an address. Furthermore, for example, a license area or the like can be similarly expressed.

Furthermore, as still another aspect, the area information does not necessarily express a planar area, and may express a three-dimensional space. For example, it may be expressed using a spatial coordinate system. In addition, for example, information indicating a predetermined closed space such as a floor number, a floor, and a room number of a building may be used.

The protection target system information is, for example, information of a radio system treated as a protection target, such as the aforementioned existing layer (incumbent tier). Examples of the situation in which this information needs to be exchanged include a situation in which cross-border coordination is required. It is well conceivable that different objects to be protected exist in the same region between neighboring countries or regions. In such a case, system information to be protected may be exchanged between different communication control devices 130 in different countries or regions to which the communication control devices belong as necessary.

As another aspect, the to-be-protected system information may include information of a secondary licensee and information of a radio system operated by the secondary licensee. The secondary licensee is specifically the Lessee of the license, and for example, it is assumed that the secondary licensee borrows the PAL from the holder and operates the wireless system owned by the secondary licensee. In a case where the communication control device 130 performs the rent management independently, information on the secondary licensee and information on the wireless system operated by the secondary licensee can be exchanged with another communication control device for the purpose of protection.

These pieces of information can be exchanged between the communication control devices 130 regardless of the decision-making topology applied to the communication control device 130.

Furthermore, these pieces of information may be exchanged in various manners. An example thereof will be described below. ID designation method Period designation method Area designation method Dump method The ID designation method is a method of acquiring information corresponding to an ID given in advance to specify information managed by the communication control device 130. For example, it is assumed that the first communication control device 130 manages a communication device 110 with ID: AAA. At this time, the second communication control device 130 designates the ID: AAA to the first communication control device 130 and makes an information acquisition request. After receiving the request, the first communication control device 130 searches for information of ID: AAA, and notifies of information related to the communication device 110 of ID: AAA, for example, registration information communication parameter information, and the like by response.

The period designation method is a method in which information satisfying a predetermined condition can be exchanged in a specified period.

Examples of the predetermined condition include the presence or absence of information update. For example, in a case where acquisition of information related to the communication device 110 in a specific period is designated by a request, registration information of the communication device 110 newly registered within the specific period can be notified by a response. Furthermore, the registration information of the communication device 110 whose communication parameter has been changed within the specific period or the information of the communication parameter may also be notified in response.

Examples of the predetermined condition include whether the predetermined condition is recorded by the communication control device 130. For example, in a case where acquisition of information related to the communication device 110 in a specific period is specified in the request, the registration information or the information of the communication parameter recorded by the communication control device 130 in the period can be notified in response. In a case where the information is updated in the period, the latest information in the period can be notified. Alternatively, the update history may be notified for each piece of information.

In the area designation system, a specific area is designated, and information of the communication device 110 belonging to the area is exchanged. For example, in a case where acquisition of information related to the communication device 110 in a specific area is designated by a request, registration information or information of a communication parameter of the communication device 110 installed in the area can be notified by a response.

The dump method is a method of providing all information recorded by the communication control device 130. At least information and area information related to the communication device 110 are desirably provided by a dump method.

The above description of the information exchange between the communication control devices 130 is based on the pull method. That is, it is a form in which information corresponding to the parameter specified in the request is responded, and can be realized by the HTTP GET method as an example. However, the present invention is not limited to the pull method, and information may be actively provided to another communication control device 130 by the push method. The push manner may be implemented by, for example, the HTTP POST method.

<2.7.2 Command/Request Procedure>

The communication control device 130 may execute a command or a request with each other. Specifically, as an example, reconfiguration of communication parameters of the communication device 110 is exemplified. For example, in a case where it is determined that the first communication device 110 managed by the first communication control device 130 is greatly interfered with by the second communication device 110 managed by the second communication control device 130, the first communication control device 130 may request the second communication control device 130 to change the communication parameter of the second communication device 110.

Another example is reconfiguration of area information. For example, in a case where calculation of coverage information and protection area information related to the second communication device 110 managed by the second communication control device 130 is incomplete, the first communication control device 130 may request the second communication control device 130 to reconfigure the area information. Besides this, the area information reconfiguration request may be made for various reasons.

<2.8 Information Transmission Means>

Notification (signaling) between entities described above may be implemented via various media. E-UTRA or 5G NR will be described as an example. As a matter of course, the embodiment is not limited thereto.

<2.8.2 Signaling Between Communication Control Device 130 and Communication Device 110>

The notification from the communication device 110 to the communication control device 130 may be performed, for example, in an application layer. For example, the hyper text transfer protocol (HTTP) may be used. Signaling may be performed by describing the required parameters in the message body of the HTTP according to a predetermined manner. Furthermore, in the case of using HTTP, notification from the communication control device 130 to the communication device 110 is also performed according to the HTTP response mechanism.

<2.8.3 Signaling Between Communication Device 110 and Terminal 120>

The notification from the communication device 110 to the terminal 120 may be performed using, for example, at least one of radio resource control (RRC) signaling, system information (SI), or downlink control information (DCI). In addition, examples of the downlink physical channel include a physical downlink control channel (PDCCH), a physical downlink shared channel (PDSCH), a physical broadcast channel (PBCH), an NR-PDCCH, an NR-PDSCH, an NR-PBCH, and the like, but the downlink physical channel may be implemented using at least one of these.

The notification from the terminal 120 to the communication device 110 may be performed using, for example, radio resource control (RRC) signaling or uplink control information (UCI, Uplink Control Information). In addition, it may be implemented using an uplink physical channel (PUCCH: Physical Uplink Control Channel, PUSCH: Physical Uplink Shared Channel, PRACH: Physical Random Access Channel).

The signaling is not limited to the physical layer signaling described above, and the signaling may be performed at a higher layer. For example, at the time of implementation at the application layer, signaling may be implemented by describing a required parameter in a message body of HTTP according to a predetermined manner.

<2.8.4 Signaling Between Terminals 120>

Figure 6:
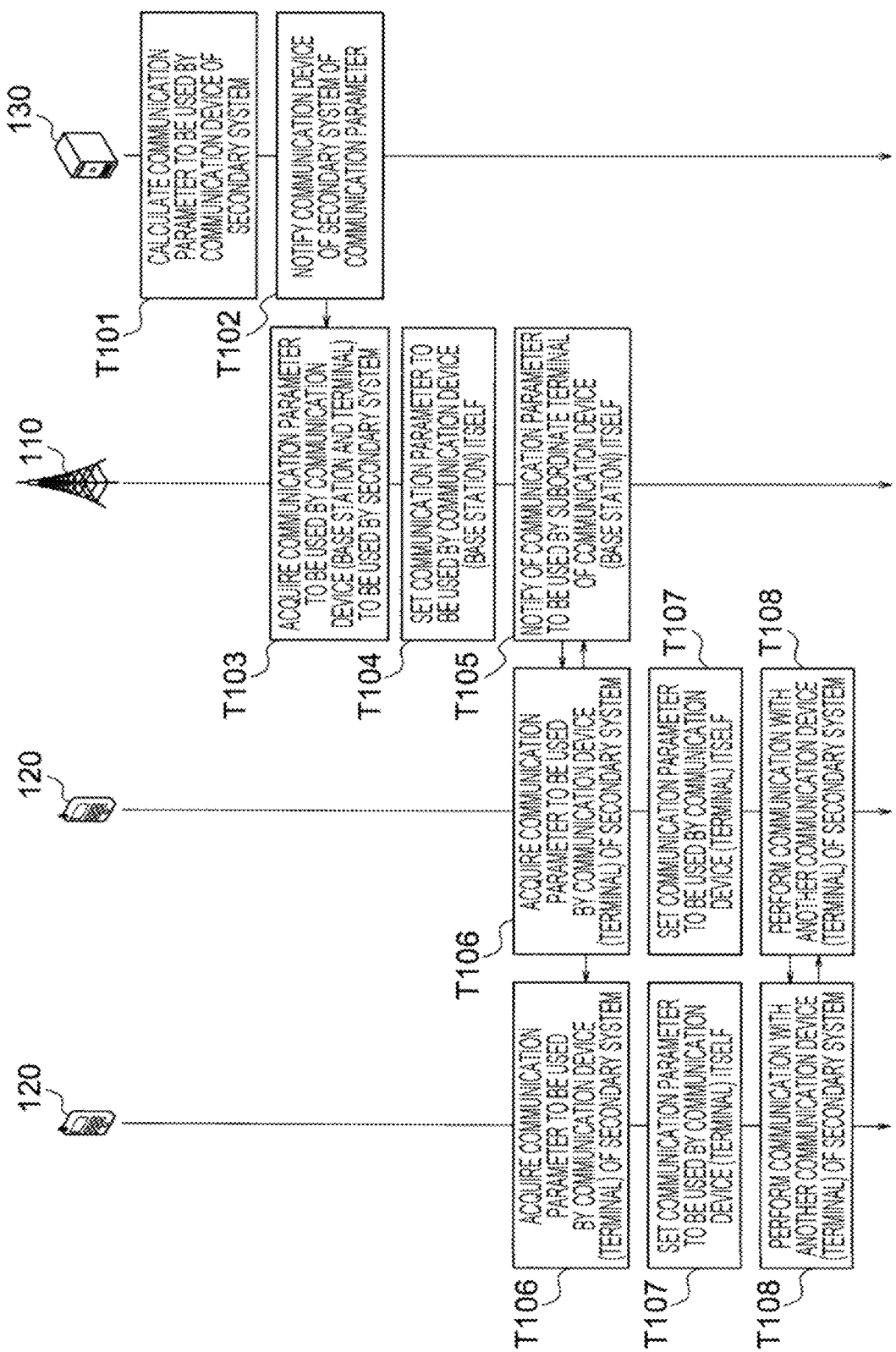
FIG. 6 is a diagram for explaining a flow of signaling between terminals.

FIG. 6 illustrates an example of a flow of signaling in a case where device-to-device (D2D) or vehicle-to-everything (V2X), which is communication between the terminals 120, is assumed as communication of the secondary system. D2D or V2X which is communication between the terminals 120 may be performed using a physical sidelink channel (PSCCH: Physical Sidelink Control Channel, PSSCH: Physical Sidelink Shared Channel, PSBCH: Physical Sidelink Broadcast Channel). The communication control device 130 calculates a communication parameter to be used by the secondary system (T101) and notifies the communication device 110 of the secondary system of the calculated communication parameter (T102). A value of the communication parameter may be determined and notified, or a condition indicating a range or the like of the communication parameter may be determined and notified. The communication device 110 acquires a communication parameter to be used by the secondary system (T103), and sets the communication parameter to be used by the communication device 110 itself (T104). Then, the communication parameter to be used by the subordinate terminal 120 of the communication device 110 is notified to the terminal 120 (T105). Each terminal 120 under the control of the communication device 110 acquires (T106) and sets (T107) a communication parameter to be used by the terminal 120. Then, communication with another terminal 120 of the secondary system is performed (T108).

The communication parameter in a case where the target frequency channel for frequency sharing is used in the sidelink (direct communication between the terminals 120) may be notified, acquired, or set in a form associated with a resource pool for sidelink in the target frequency channel. The resource pool is a radio resource for a sidelink set by a specific frequency resource or time resource. Examples of the frequency resource include a resource block, a component carrier, and the like. The time resource includes, for example, a radio frame, a subframe, a slot, a mini-slot, and the like. In a case where a resource pool is set in a frequency channel to be subjected to frequency sharing, the resource pool is set in the terminal 120 by the communication device 110 on the basis of at least one of RRC signaling, system information, or downlink control information. Then, the communication parameters to be applied in the resource pool and the sidelink are also set in the terminal 120 by the communication device 110 on the basis of at least one of RRC signaling, system information, or downlink control information from the communication device 110 to the terminal 120. The notification of the setting of the resource pool and the notification of the communication parameter to be used in the sidelink may be performed simultaneously or individually.

<<3. Mechanism for Upgrading Priority of Radio Wave Use and Fallback>>

As described above, the communication device 110 such as CBSD can perform radio wave use with priority of Priority Access (PA) or General Authorized Access (GAA) according to the frequency sharing standard WINNF-TS-0016 in the 3550 to 3700 MHz band in the United States. The communication control device 130 such as SAS examines the set of the maximum allowable EIRP and the frequency channel (frequency band) requested from the communication device 110 in permitting the radio wave use. The requested maximum allowable EIRP and frequency channel are approved as grants (grants). The communication control device 130 notifies the communication device 110 of the priority of either PA or GAA at the time of approval of the grant. The radio wave use of the communication device 110 based on the grant is managed by a procedure called heartbeat (hereinafter, heartbeat-procedure) performed between the communication control device 130 and the communication device 110 described above.

In the present embodiment, a mechanism for changing (upgrading and fallback) a parameter of a grant (priority of radio wave use or the like) easily or early is provided. As a result, the operator of the communication device 110 does not need to reapply for the grant with respect to the communication control device 130, and thus, it is possible to prevent the stop of the radio wave transmission and the deterioration of the end user experience that occurs in association therewith.

Figure 7:
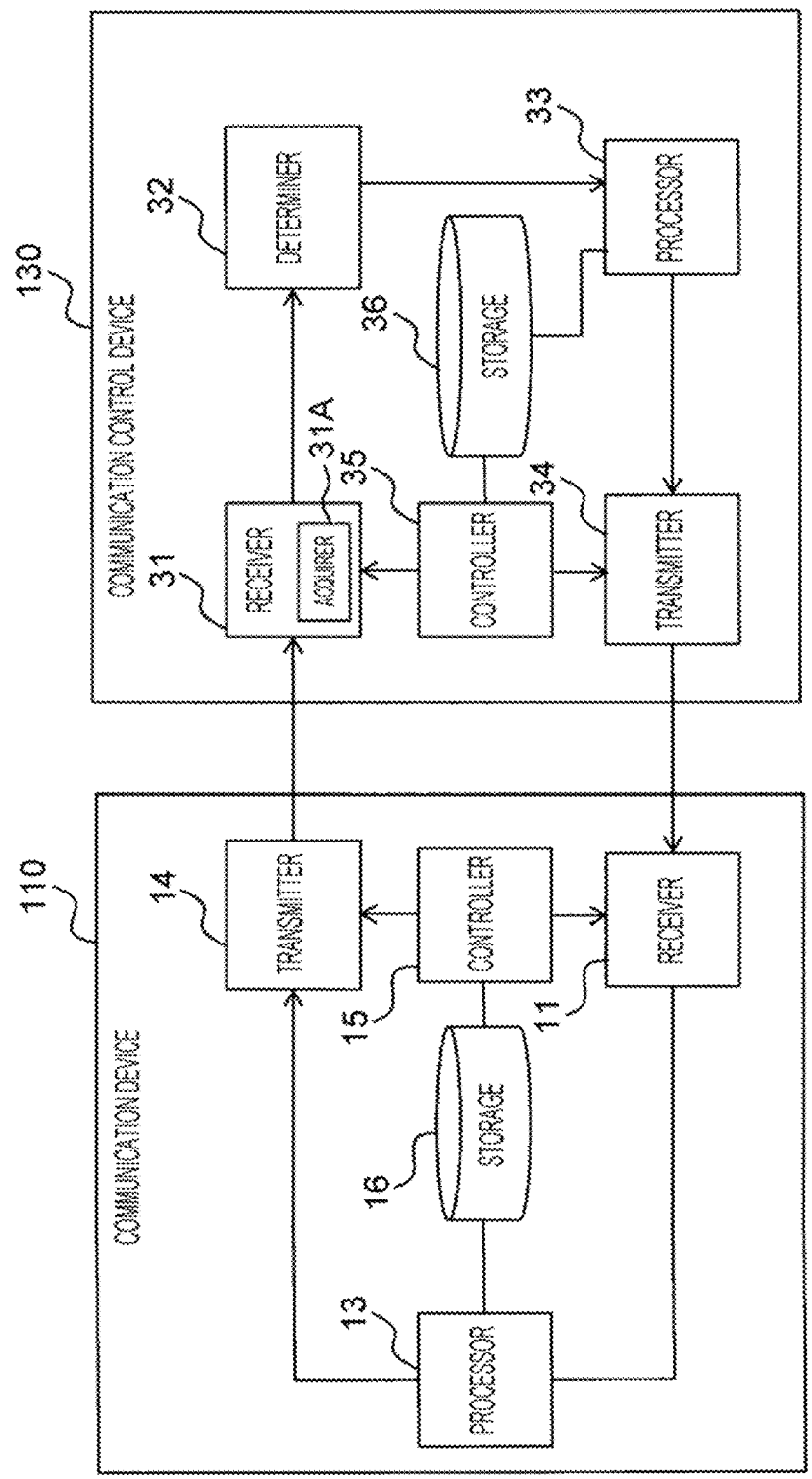
FIG. 7 is a block diagram of a communication system according to an embodiment of the present disclosure.
Figure 8:
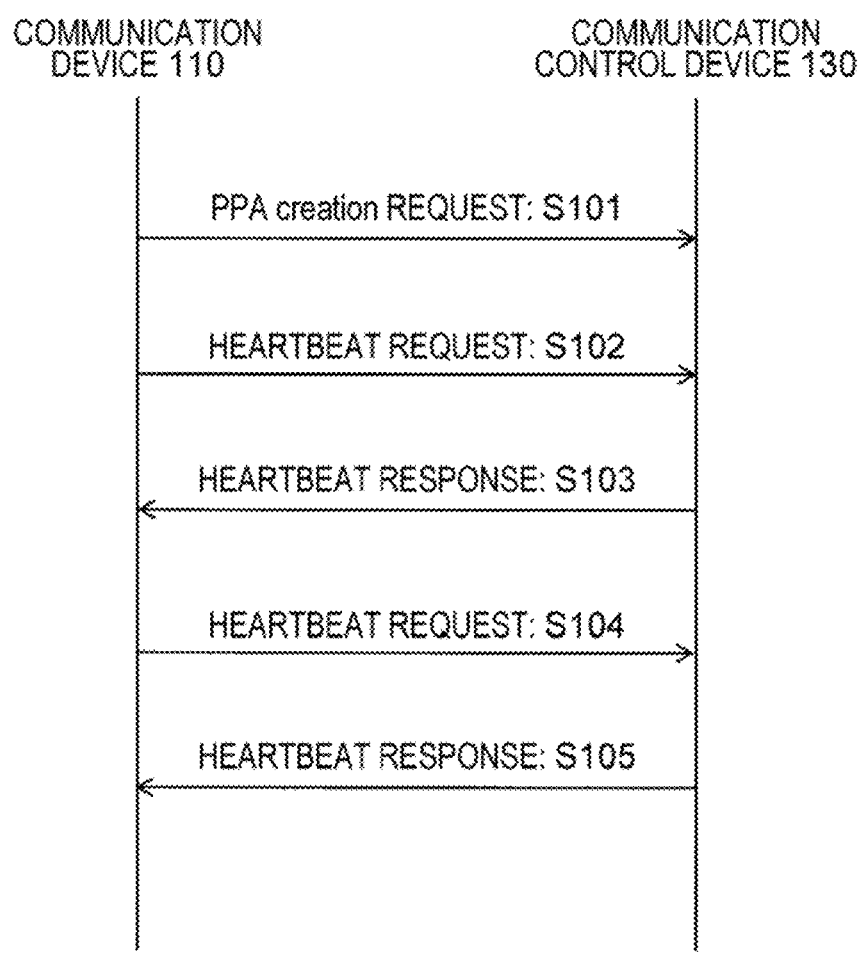
FIG. 8 is an operation sequence diagram performed between the communication device and the communication control device.

FIG. 7 is a block diagram of a communication system according to an embodiment of the present disclosure. FIG. 8 is an operation sequence diagram performed between the communication device 110 and the communication control device 130. The communication system in FIG. 7 includes a communication device 110 and a communication control device 130. Only blocks related to a portion that performs processing mainly related to the present embodiment are illustrated, and illustration of blocks related to other processing is omitted.

The communication control device 130 includes a receiver 31, a determiner 32, a processor 33, a transmitter 34, a controller 35, and a storage 36. The receiver 31 includes an acquirer 31A. Here, the acquirer 31A is provided in the receiver 31, but may be provided outside the receiver 31. The controller 35 controls the entire communication control device 130 by controlling each element in the communication control device 130.

The communication device 110 includes a receiver 11, a processor 13, a transmitter 14, a controller 15, and a storage 16. The controller 15 controls the entire communication device 110 by controlling each element in the communication device 110.

In the storage 36 of the communication control device 130, various types of information necessary for communication with the communication device 110 and other communication control devices are stored in advance. In the storage 16 of the communication device 110, various types of information necessary for communication with the communication control device 130 and communication with the terminal 120 as a service provision target are stored in advance.

Each processing block of the communication control device 130 and the communication device 110 is configured by a hardware circuit, software (program or the like), or both of them. The storage 36 and the storage 16 are configured by an arbitrary storage device such as a memory device, a magnetic storage device, or an optical disk. The storage 36 and the storage 16 may be externally connected to the communication control device 130 and the communication device 110 not in the communication control device 130 and the communication device 110 but in a wired or wireless manner. The transmitter 34 and the receiver 31 in the communication control device 130 and the transmitter 14 and the receiver 11 in the communication device 110 may include one or a plurality of network interfaces according to the number or types of connectable networks. In a case where the transmitter 34 and the receiver 31 in the communication control device 130 and the transmitter 14 and the receiver 11 in the communication device 110 perform wireless communication, the communication control device 130 and the communication device 110 may each include at least one antenna.

The communication system of FIG. 7 provides priority upgrade and fallback mechanisms for grants by improving PPA (PAL (Priority Access License) Protection Area) Creation and heartbeat procedures. As described above, the PAL Protection Area (PPA) is a protection area of the communication device 110 that becomes the high priority secondary system. In the following description, it is assumed that the communication device 110 is CBSD and the communication control device 130 is SAS.

First, a mechanism of the upgrade according to the present embodiment will be described. Here, it is assumed that a communication device 110 of a certain operator uses radio wave transmission on the basis of a GAA grant. The GAA grant is a grant permitted by SAS on the basis of GAA and has a lower priority than a grant permitted on the basis of on PAL. Assuming that the priority of the PAL is the first priority, the priority of the GAA is the second priority lower than the first priority. First, the processor 13 of the communication device 110 of a certain operator generates a request (application data) for applying for generation (hereinafter, PPA Creation) of PPA. For example, it is generated on the basis of the specification of WINNF-TS-0112. The transmitter of the communication device 110 transmits a PPA Creation request to the communication control device 130.

For example, when an operator of a certain operator accesses a web service provided by the communication control device 130 and inputs necessary information from a browser, a PPA Creation request (application data) is generated and acquired by the communication control device 130. Alternatively, the PPA Creation request generated by the communication device 110 may be transmitted to the communication control device 130, and the acquirer 31A may acquire the request (an example of this case is illustrated in sequence S101 of FIG. 8). Alternatively, the communication device 110 generates a PPA Creation request (application data) on the basis of the content of the PPA Creation application set in advance by the operator. The generated PPA Creation request may be directly transmitted to the communication control device 130, and the acquirer 31A may acquire the PPA Creation request (application data).

Here, there may be the following two types of PPA Creation.
Request to newly generate PPA (new creation request)
Request to extend existing PPA (existing PPA extension request)

In a case where the type of PPA Creation is a new creation request, the following information is included in the PPA Creation request.

(A1) PAL information to exercise rights: ID of PAL to be subject to application for PPA Creation (identifier for identifying rights)

(A2) PPA Cluster List: list of IDs of communication devices constituting PPA (A3) List of grant IDs to be upgraded: List of IDs of grants to be upgraded from GAA to PAL (A4) PPA desired outer shape information (optional): information representing a desired geographical shape of PPA. In a case where the outer shape is expressed by coordinates, the outer shape may be a circle in which center coordinates and a radius are designated, a square in which coordinates of four points are designated, or the outer shape may be designated by another method.

In this manner, the PPA Creation request includes an application for an upgrade of the grant. That is, it includes a list of IDs of grants that are desired to be upgraded from GAA to PAL.

In a case where the type of PPA Creation is the existing PPA extension request, the following information is included in the PPA Creation request.

(B1) PAL information during exercise: ID of PAL subject to application for PPA Creation among currently owned PALs (B2) ID of PPA to be expanded (PPA-ID): ID of PPA whose area is desired to be expanded (B3) New participation ID list: List of IDs of communication devices to newly join with the PPA Cluster List (B4) List of grant IDs to be upgraded: List of IDs of grants to be upgraded from GAA to PAL (B5) PPA desired outer shape information after expansion (optional): information representing a desired geographical shape of the PPA after expansion.

(B6) PPA desired outer shape information (optional) of communication device to be upgraded The acquirer 31A of the communication control device 130 acquires a PPA Creation request (application data) (S101 in FIG. 8). The determiner 32 determines whether to permit the application of the PPA Creation request on the basis of the PPA Creation request received by the receiver 31.

The determiner 32 determines whether the ID of the PAL is valid, and rejects the application for upgrade in a case where the ID of the PAL is not valid. In addition, the determiner 32 determines whether the frequency range permitted by the GAA grant indicated by the grant ID list to be upgraded satisfies the condition regarding the frequency band. If the condition related to the frequency band is not satisfied, the upgrade application may be rejected. As an example that does not meet the condition on the frequency band, a frequency range allowed in the GAA grant may not conform to channel channelization (PAL channelization) of the PAL specified in the PAL information, or may not match channel allocation of the PAL specified in the PAL information.

The determiner 32 may accept the upgrade request according to a condition even in a case where it is not compatible with the channelization of the PAL. For example, in a case where the frequency range permitted by the current GAA grant includes the above-described channel allocated to the specified PAL, the upgrade request is accepted on condition that the channel is narrowed to the channel included in the frequency range. That is, even in a case where the condition of the frequency band of the PAL is not satisfied, the upgrade request is accepted on the condition that the frequency band of the current grant is narrowed to the channel available in the PAL. As described above, in a case where the frequency band used by the communication device 110 in the GAA is different from the frequency band available in the PAL, the frequency band permitted to be used in the PAL is determined on the basis of the frequency range in which both the frequency bands are common.

The determiner 32 determines to permit an upgrade application when there is no reason to reject the upgrade application.

In a case where the determiner 32 determines to permit the PPA Creation application, the processor 33 calculates PPA on the basis of the content applied in the PPA Creation request. The basic calculation of PPA is performed on the basis of, for example, the specification of WINNF-TS-0112. In a case where the information of the desired outer shape is included in the PPA Creation request, the calculated PPA is compared with the desired outer shape. In a case where the calculated PPA includes the desired outer shape, the desired outer shape is adopted.

The storage 36 may store the content of the PPA Creation application (A1 to A4, B1 to B6), the presence or absence of permission for the upgrade application, the information after the change of the target grant, and the like. The information after the change of the target grant may include, for example, a channel type after the change of the target grant, a condition of a permitted frequency band, information of an adopted PPA outer shape, and the like. Other information may be included.

After approving the PPA Creation request (application data), the receiver 31 of the communication control device 130 receives a heartbeat request which is a frequency use notification transmitted from the transmitter 14 of the communication device 110 (S102). The processor 33 processes a heartbeat request transmitted from the communication device 110 on the basis of the grant ID list to be upgraded included in the PPA Creation request.

Specifically, the response information (heartbeat response) is returned by processing the heartbeat request related to the grant not included in the grant ID list as usual. In a case where a heartbeat request related to a grant included in the grant ID list is received, response information (heartbeat response) is returned by performing the following processes [1] to [3] on the grant to be upgraded.

[1] Change grant channel type (channelType) from GAA to PAL. In other words, the priority of the radio wave use related to the grant is changed from GAA to PAL. [2] The grant expiration time (grant Expire Time) is changed to match the PAL expiration time. That is, the grant expiration time is updated to the expiration time of the PAL.

[3] An operation parameter of the communication device 110 is changed. Specifically, the operation frequency range is changed in a case where the change of the frequency band is set as a condition at the time of application permission. In a case where a change in transmission power (EIRP or the like) is set as a condition at the time of application permission, the transmission power may be changed.

Even in the case of a heartbeat request for a grant included in the grant ID list to be upgraded, processing may be performed as usual without performing the processing [1] to [3] depending on conditions. Specifically, for example, processing [1] to [3] may be performed in a case where a Boolean parameter (grant Renew) meaning a grant update request is included in a heartbeat request and the parameter value indicates TRUE, and the processing may not be performed in a case where the parameter value does not indicate TRUE.

The processor 33 generates response information (heartbeat response) including information notifying that the processes [1] to [3] have been performed and a response code. The transmitter 34 transmits the heartbeat response to the communication device 110 (S103 in FIG. 8). The heartbeat response may include an expiration time of the grant and an operation parameter (operation frequency range, changed transmission power, and the like) after the change. The operation parameter may be transmitted to the communication device 110 as a response different from the heartbeat response. The heartbeat response may be transmitted for each grant, or one heartbeat response may be collectively transmitted for all grants.

The response code indicates a result of processing for the heartbeat request. In a case where the upgrade application is permitted, for example, 0 (SUCCESS) or 501 (SUSPENDED_GRANT) is used as the response code. 0 (SUCCESS) means normal. Reference numeral 501 indicates an instruction to suspend radio wave transmission.

The controller 35 performs detection processing of a signal of a primary system (an onboard radar or the like) in a frequency range related to the upgraded grant. In a case where a signal of the primary system is detected, 501 is used as a response code. In a case where no primary system signal is detected, 0 (SUCCESS) is used. Note that, in a case where the upgrade application is not permitted, a response code of a numerical value indicating rejection may be included.

Note that the controller 35 may manage a grant state machine (Grant State Machine) that manages the state of the grant. The grant state machine indicates a state of whether radio wave transmission related to the grant is permitted. In a case where returning 0 (SUCCESS), the processor may set the state of grant (operation State) in the grant state machine (Grant State Machine) to "AUTHORIZED". In a case where 501 (SUSPENDED_GRANT) is returned, the state of the grant may be changed to "GRANTED". "AUTHORIZED" means that radio wave transmission is allowed. "GRANTED" means that radio wave transmission is not allowed.

The receiver 11 of the communication device 110 receives the heartbeat response transmitted from the communication control device 130 (S103).

The processor 13 of the communication device 110 checks content of the heartbeat response, and performs the following processing in a case where the response code included in the heartbeat response is 0 (SUCCESS). [1] Change channel type (channelType) of grant allowed for upgrade from GAA to PAL. That is, the priority of the radio wave use related to the grant is changed from GAA to PAL. [2] The expiration time of the grant is reset to the expiration time specified in the heartbeat response.

[3] In a case where the change of the operation frequency range is instructed as the operation parameter in the heartbeat response or the like, the frequency range related to the grant is changed to the designated range. [4] In a case where it is instructed to change the transmission power as an operation parameter in a heartbeat response or the like, the setting of the transmission power (for example, EIRP) is changed on the basis of a specified value. In a case where the value of the transmission power is not specified by the heartbeat response or the like, the same transmission power as that before the channel type is changed may be used. Alternatively, the communication device 110 may calculate the transmission power by its own device, or may inquire of another device (the communication control device 130 or another management device) about the transmission power.

The storage 16 stores a result of the processing performed by the processor 13. For example, the priority after the change related to the grant and the expiration time after the change of the grant are stored. In addition, in a case where the operating frequency range is changed, the operating frequency range after the change, and in a case where the transmission power is changed, the transmission power after the change and the like are also stored.

In a case where the response code included in the heartbeat response is 501 (SUSPENDED_GRANT), the processor 13 of the communication device 110 performs processing for temporarily stopping radio wave transmission (However, the grant is not discarded). Thereafter, the same processing as [1] to [4] described above is performed. That is, the following processing is performed. [1] to [4] are the same as those in the case where the response code is 0. Note that, even after the processing of [1] to [4] is performed, the suspension of the radio wave transmission is maintained until permission is given in the next heartbeat procedure.

[0] The radio wave transmission related to the target grant is temporarily stopped.
[1] Change channel type (channelType) of grant allowed for upgrade from GAA to PAL. That is, the priority of the radio wave use related to the grant is changed from GAA to PAL.
[2] The expiration time of the grant is reset to the expiration time specified in the heartbeat response or another response.
[3] In a case where the change of the operation frequency range is instructed as the operation parameter in the heartbeat response or the like, the frequency range related to the grant is changed to the designated range. [4] In a case where the transmission power is instructed to be changed as an operation parameter in a heartbeat response or the like, the setting of the transmission power (for example, EIRP or the like) is changed on the basis of a specified value.

After performing the processing of [1] to [4] or [0] to [4], the transmitter 14 of the communication device 110 transmits a heartbeat request including the parameter of the changed grant in the next heartbeat procedure (S104 in FIG. 8).

The receiver 31 of the communication control device 130 receives the heartbeat request transmitted from the communication device 110 (S104 in FIG. 8). On the basis of the information stored in the storage 36, the determiner 32 of the communication control device 130 determines whether the parameter of the grant notified in the heartbeat request matches the result of the upgrade determination. In a case of matching, the transmitter 34 transmits a heartbeat response including the response code as 0 (SUCCESS) (S105 in FIG. 8). In a case not matching, it is sufficient if a heartbeat response notifying rejection is transmitted.

The receiver 11 of the communication device 110 receives the heartbeat response transmitted from the communication control device 130 (S105 in FIG. 8). When a heartbeat response including a response code of 0 (success) is received, the frequency band of the upgraded grant can be continuously used. When the response code included in the heartbeat response received in the sequence S103 is 501, the pause of the radio wave transmission is canceled by receiving the heartbeat response including the response code of 0 (SUCCESS) this time. As a result, radio wave transmission related to the upgraded grant can be resumed. The communication device 110 can communicate with the terminal 120 with a priority (PAL priority) based on the upgraded grant.

The controller 35 of the communication control device 130 executes interference protection of the CPAS (Coordinated Periodic Activities among SASs) and the PPA. The see-pass executes calculation and the like related to higher-tier protection. For example, the communication control device 130 performs interference calculation with the frequency band used by the primary user (radar system or the like), and shares information such as the managed grant and the position of the managed communication device 110 with the other communication control device 130 as a result of the interference calculation. The see-path is performed by the plurality of communication control devices 130 at regular time intervals (for example, once a day and midnight hours). In addition, the interference protection of the PPA is to generate the PPA, which is a coverage area that protects the upgraded grant (grant of the PAL) from interference, to protect the PPA from external interference. That is, when the communication device 110 uses radio waves in PPA, radio wave interference from a communication device or a terminal that uses radio waves with the priority of GAA is protected. The PPA includes one or more communication devices to which a PAL grant is set.

The controller 35 of the communication control device 130 may not perform interference protection of the PPA for the upgraded grant until the next CPAS is started after the upgrade of the grant is completed. In other words, at the latest, it is sufficient if the communication control device 130 enables the PPA to protect the upgraded grant at the start of the next CPAS. In the CPAS, the communication control device 130 transmits information related to the upgraded grant to the other communication control device 130, so that the information related to the upgraded grant is shared with the other communication control device 130.

In the above description, the communication system according to the present embodiment has been described using a case where the grant is upgraded as an example, but an example of fallback (downgrade) of the grant will be described below.

Figure 9:
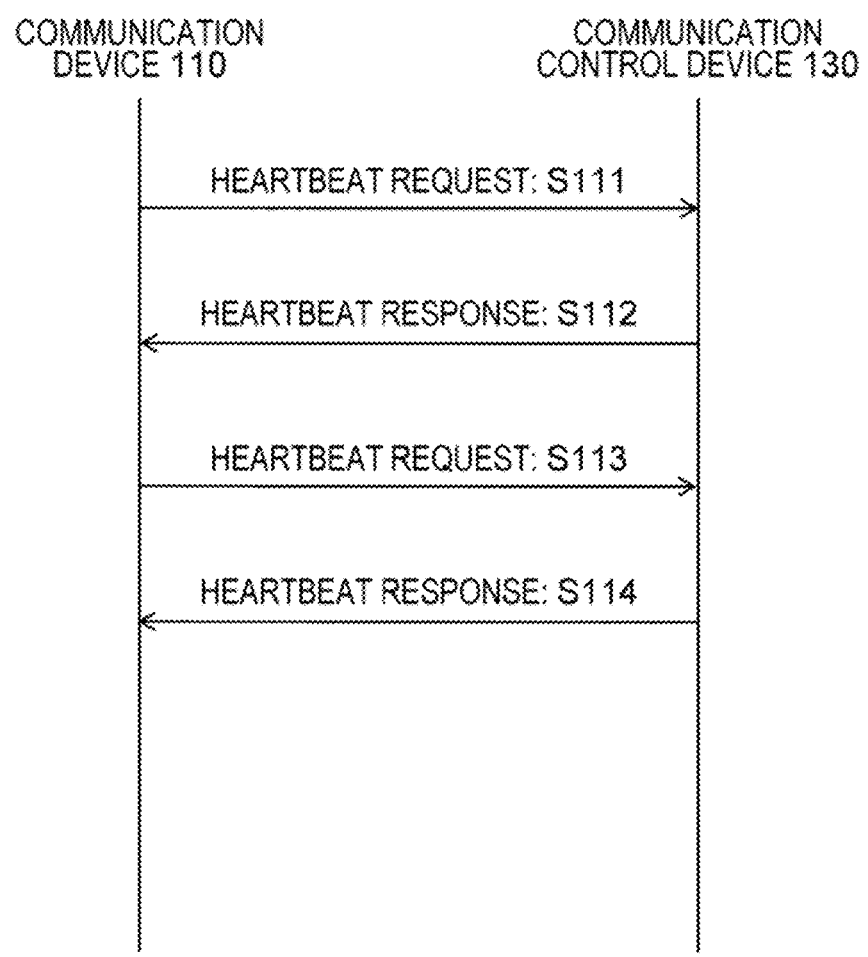
FIG. 9 is a diagram illustrating an example of an operation sequence in a case where a grant is fallback.

FIG. 9 illustrates an example of an operation sequence in a case where the grant is fallback. The processor 33 of the communication control device 130 determines whether the fallback condition is satisfied for the grant (target grant) upgraded to the PAL. Examples of fallback conditions include:
 a case where § PAL Expired
 a case where § If the lease term of the PAL expires
 a case where § If PAL service requirements are no longer met
 Operational convenience As the service requirement, for example, there is a case where the coverage of the service needs to be provided to a certain percentage (such as 50% or more) of the population in the area licensed as the PAL, or the like.

In a case of making the determination on the basis of the PAL service requirement, information on the number of terminals served by the communication device 110 may be provided from the communication device 110 to the communication control device 130 via heartbeat procedures. The information on the number of terminals may be a value (such as a Boolean value) indicating the presence or absence of a terminal providing a service. On the basis of the information on the number of terminals, the communication control device 130 may determine whether an operator holding a PAL satisfies the service requirement in the license area.

At this time, it may not be possible to determine whether the service requirement is satisfied only with the information provided from one communication device 110. Therefore, the communication control device 130 may determine whether or not the fallback condition is satisfied after obtaining the information on the number of terminals from all the communication devices 110 belonging to the license area.

In a case where the fallback condition is satisfied, the determiner 32 of the communication control device 130 determines that the PAL of the target grant has expired. The processor 33 of the communication control device 130 performs processing for fallback from the grant using the heartbeat procedure. Specifically, first, the receiver 31 receives a heartbeat request from the communication device 110 of the operator of the target grant (S111 in FIG. 9). When a heartbeat request is received after the fallback condition is satisfied, the processor 33 performs the following process.

[11] Change channel type of target grant from PAL to GAA. That is, the priority of radio wave use related to the target grant is changed from PAL to GAA.

[12] Change the expiration time for subject grants (GAA expiration time). The expiration time of the GAA is predetermined. The expiration time of the GAA may be a sufficiently large value.

As in the case of the grant upgrade, even in the case of the heartbeat request for the grant included in the grant ID list to be downgraded, the processing may be performed as usual without performing the processing [11] and [12] depending on conditions. Specifically, for example, in a case where a Boolean parameter (grant Renew) meaning a grant update request and a parameter indicating a fallback request are included in a heartbeat request and the grant Renew value indicates TRUE, the processes [11] and [12] may be performed, and otherwise, the process may not be performed.

The heartbeat response is generated as in the case of the grant upgrade. The response code used in the heartbeat response is, for example, 0 (SUCCESS) or 501 (SUSPENDED_GRANT). In a case where 0 (SUCCESS) is used, the processor 33 of the communication control device 130 sets the grant state (operation state) in the grant state machine to "AUTHORIZED". In a case where 501 (SUSPENDED_GRANT) is used, "GRANTED" may be used. The heartbeat response may include instruction information for returning the operating parameters such as the frequency range and the transmission power to the value of the GAA.

The storage 36 stores information after the change of the target grant. For example, the channel type (GAA) after the change of the target grant, the information of the expiration time after the change of the grant, and the like are stored.

The transmitter 34 transmits the heartbeat response to the communication device 110 (S112 in FIG. 9).

The receiver 11 of the communication device 110 receives the heartbeat response transmitted from the communication control device 130 (S112 in FIG. 9).

In a case where the response code included in the heartbeat response is 0 (SUCCESS), the processor 13 of the communication device 110 performs the following processing.

[11] Change channel type of target grant from PAL to GAA (fallback) That is, the priority of radio wave use related to the target grant is changed from PAL to GAA. [12] Change the expiration time for subject grants (GAA expiration time).

In a case where the response code included in the heartbeat response is 501 (SUSPENDED_GRANT), the processor 13 of the communication device 110 performs processing for temporarily stopping radio wave transmission (However, the grant is not discarded). Thereafter, the processing of [11] to [12] described above is performed. That is, the processor 13 of the communication device 110 performs the following processing. [11] to [12] are the same as those in the case where the response code is 0. The operating parameters such as the frequency range and the transmission power may be returned to the values of GAA. [10] The radio wave transmission related to the target grant is temporarily stopped.

[11] Change channel type of target grant from PAL to GAA (fallback)

[12] Change the expiration time for subject grants (GAA expiration time).

After performing the processing of [11] to [12] or [10] to [12], the transmitter 14 of the communication device 110 generates a heartbeat request including the parameter of the changed grant in the next heartbeat procedure. The transmitter 14 transmits the generated heartbeat request (S113 in FIG. 9).

The receiver 31 of the communication control device 130 receives a heartbeat request from the communication device 110 (S113 in FIG. 9). The determiner 32 of the communication control device 130 determines whether the parameter of the grant included in the heartbeat request matches the result previously determined by the determiner 32 on the basis of the information stored in the storage 36. In the case of matching, the transmitter 34 transmits a heartbeat response including the response code as 0 (SUCCESS) (S114 in FIG. 9).

The receiver 11 of the communication device 110 receives the heartbeat response transmitted from the communication control device 130 (S114 in FIG. 9). In a case of receiving a heartbeat response including a response code of 0 (SUCCESS), the communication device 110 can continue to use the frequency band of the fallback grant. Even in a case where the response code of the heartbeat response notifying the fallback is 501, it is possible to resume the radio wave transmission related to the fallback grant by receiving the heartbeat response including the response code of 0 (SUCCESS) this time. That is, the communication device 110 can communicate with the terminal 120 (see FIG. 1).

The controller 35 of the communication control device 130 may maintain interference protection for the fallback grant until the next CPAS (Coordinated Periodic Activities among SASs) is started after the fallback of the grant is completed. In the next CPAS, the controller 35 of the communication control device 130 transmits information on the fallback grant to the other communication control device 130, and shares the information with the other communication control device 130. The information of the fallback grant may include information notifying that the PPA related to the fallback grant is invalidated.

Figure 10:
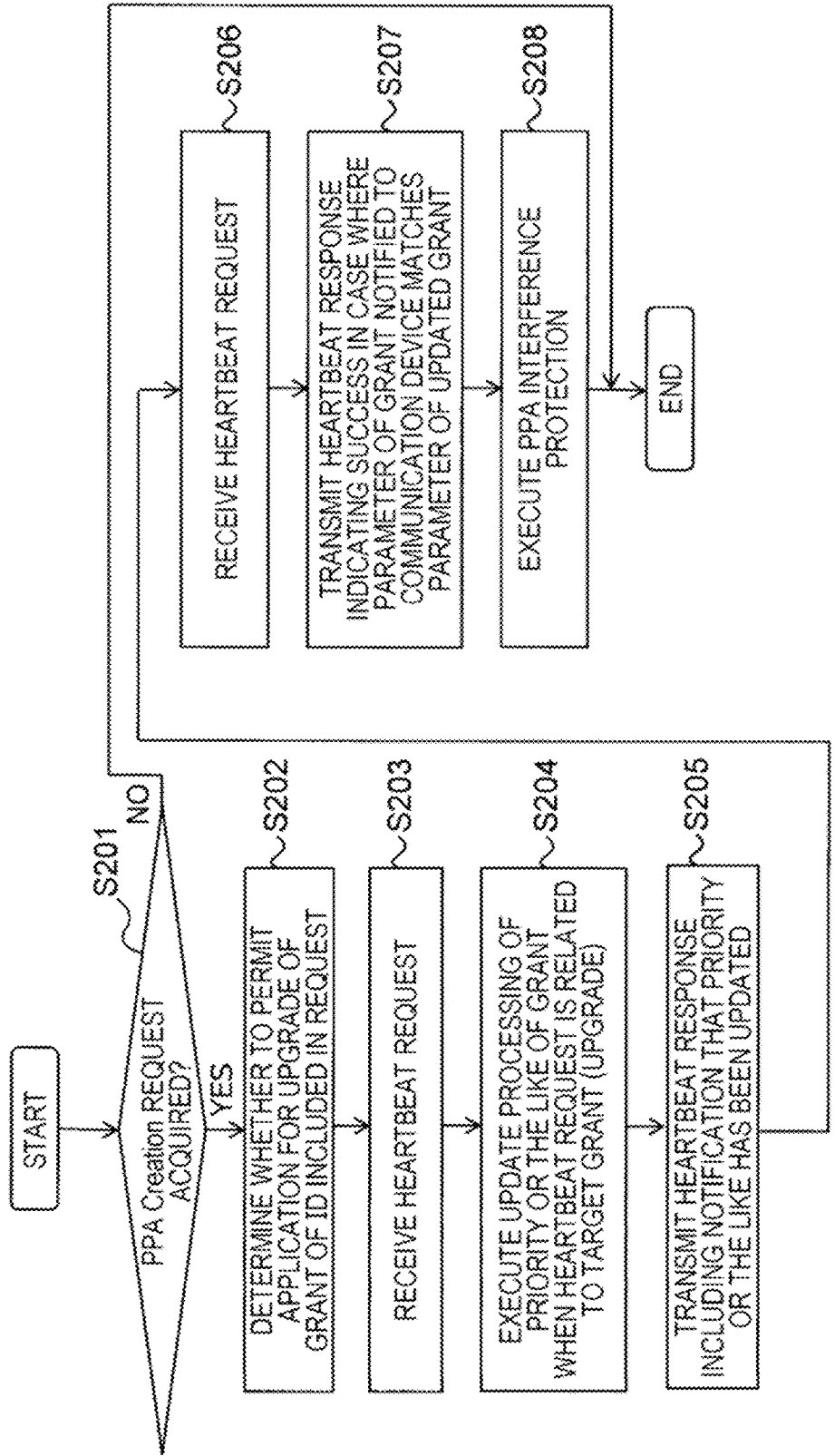
FIG. 10 is a flowchart illustrating an example of an operation of the communication control device according to the embodiment of the present disclosure.

FIG. 10 is a flowchart illustrating an example of the operation of the communication control device 130 according to the present embodiment. Here, the case of the operation of performing the grant upgrade will be described as an example.

The determiner 32 of the communication control device 130 determines whether the PPA Creation request (application data) is acquired by the acquirer 31A (S201). The PPA Creation request includes an upgrade request for the grant to be upgraded (such as a list of grants to be upgraded). The grant upgrade request corresponds to a request for changing the priority of radio wave use of the communication device 110 to a PAL higher than the GAA on the basis of a PAL that is a right to perform radio wave use with a first priority. In a case where the PPA Creation request has not been acquired, this process ends.

In a case where the PPA Creation request is received, the determiner 32 determines whether to permit the application for an upgrade of the grant on the basis of the PPA Creation request (S202). For example, in a case where the PAL included in the PPA Creation request is valid (legitimate) and the condition or the like of the frequency band of the PAL described above is satisfied, permission for the upgrade application is determined. In a case where there is no reason to reject the upgrade application, the determiner 32 determines to permit the upgrade application.

The receiver 31 receives a heartbeat request transmitted from the transmitter 14 of the communication device 110 (S203). In a case where the received heartbeat request is a heartbeat request related to a grant that is not included in the grant ID list to be upgraded, it is sufficient if the processor 33 processes the received heartbeat request as usual and transmits a heartbeat response.

In a case where the received heartbeat request is a heartbeat request related to a grant included in the grant ID list, the processing of [1] to [3] described above is performed on a grant to be upgraded (S204). That is, the channel type (channelType) of the grant is changed from GAA to PAL (that is, the priority of the grant is changed), and the grant expiration time (grant Expire Time) is changed according to the expiration time of the PAL. The operating parameters (for example, at least one of the operating frequency range and the transmission power) of the communication device 110 are changed as necessary.

The transmitter 34 transmits a heartbeat response including information notifying that [1] to [3] have been performed and a response code to the communication device 110 (S205). The heartbeat response may include an expiration time of the grant and an operation parameter (operating frequency range, transmission power, and the like) after the change. For example, 0 (SUCCESS) or 501 (SUSPENDED_GRANT) is used as the response code. Note that the processing of [1] to [3] is not performed for the grant for which the application for the upgrade is not permitted. In this case, it is sufficient if a heartbeat response of rejection is transmitted.

In the next heartbeat procedure, the receiver 31 receives a heartbeat request including the parameter of the changed grant from the transmitter 14 of the communication device 110 (S206).

On the basis of the information stored in the storage 36, the determiner 32 determines whether the notified parameter of the grant matches the result of the upgrade determination. In the case of matching, the transmitter 34 transmits a heartbeat response including the response code as 0 (SUCCESS) (S207). In a case not matching, it is sufficient if a heartbeat response notifying rejection is transmitted.

The controller 35 of the communication control device 130 performs periodic CPAS (Coordinated Periodic Activities among SASs) and performs interference protection of PPA (S208).

Figure 11:
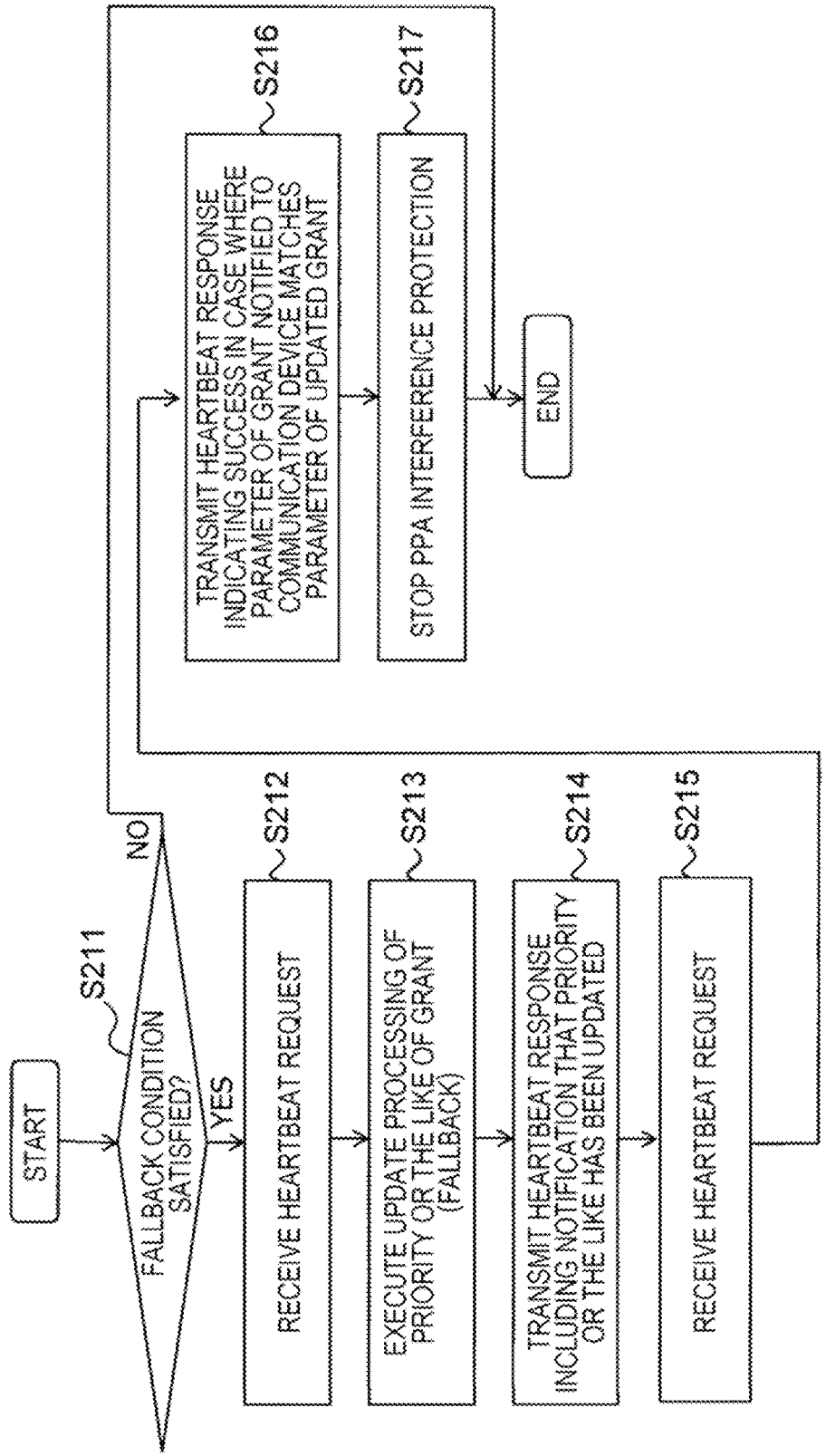
FIG. 11 is a flowchart illustrating another example of the operation of the communication control device according to the embodiment of the present disclosure.

FIG. 11 is a flowchart illustrating another example of the operation of the communication control device 130 according to the present embodiment. Here, a case of an operation of performing fallback (downgrade) of grant will be described as an example.

The determiner 32 of the communication control device 130 determines whether the fallback condition is satisfied for the PAL (target PAL) of the upgraded grant (S211). In a case where the fallback condition is not satisfied, the process ends. In a case where the fallback condition is met, determine that the PAL for the target grant has expired. The processor 33 is notified that the PAL of the target grant has expired. Information indicating that the PAL of the target grant has expired may be stored in the storage 36.

The receiver 31 receives a heartbeat request transmitted from the transmitter 14 of the communication device 110 (S212). The processor 33 performs the processing of [11] to [12] described above on the fallback target grant (S213). That is, the channel type (channelType) of the grant is changed from PAL to GAA (that is, the priority of the grant is changed), and the grant expiration time (grant Expire Time) is changed according to the expiration time of the GAA. Furthermore, the operation parameter (at least one of operating frequency range and transmission power, and the like) of the communication device 110 is changed as necessary.

The transmitter 34 transmits a heartbeat response including information notifying that [11] to [12] have been performed and a response code to the communication device 110 (S214). The heartbeat response may include an expiration time of the grant and an operation parameter (at least one of operating frequency range and transmission power, and the like) after the change. For example, 0 (SUCCESS) or 501 (SUSPENDED_GRANT) is used as the response code.

In the next heartbeat procedure, the receiver 31 receives a heartbeat request including the parameter of the changed grant from the transmitter 14 of the communication device 110 (S215).

The determiner 32 determines whether the notified parameter of the grant matches the result of the fallback determination on the basis of the information stored in the storage 36. In the case of matching, the transmitter 34 transmits a heartbeat response including the response code as 0 (SUCCESS) (S216). In a case not matching, it is sufficient if a heartbeat response notifying rejection is transmitted.

The controller 35 of the communication control device 130 performs periodic CPAS (Coordinated Periodic Activities among SASs) and stops interference protection of PPA (S217).

Figure 12:
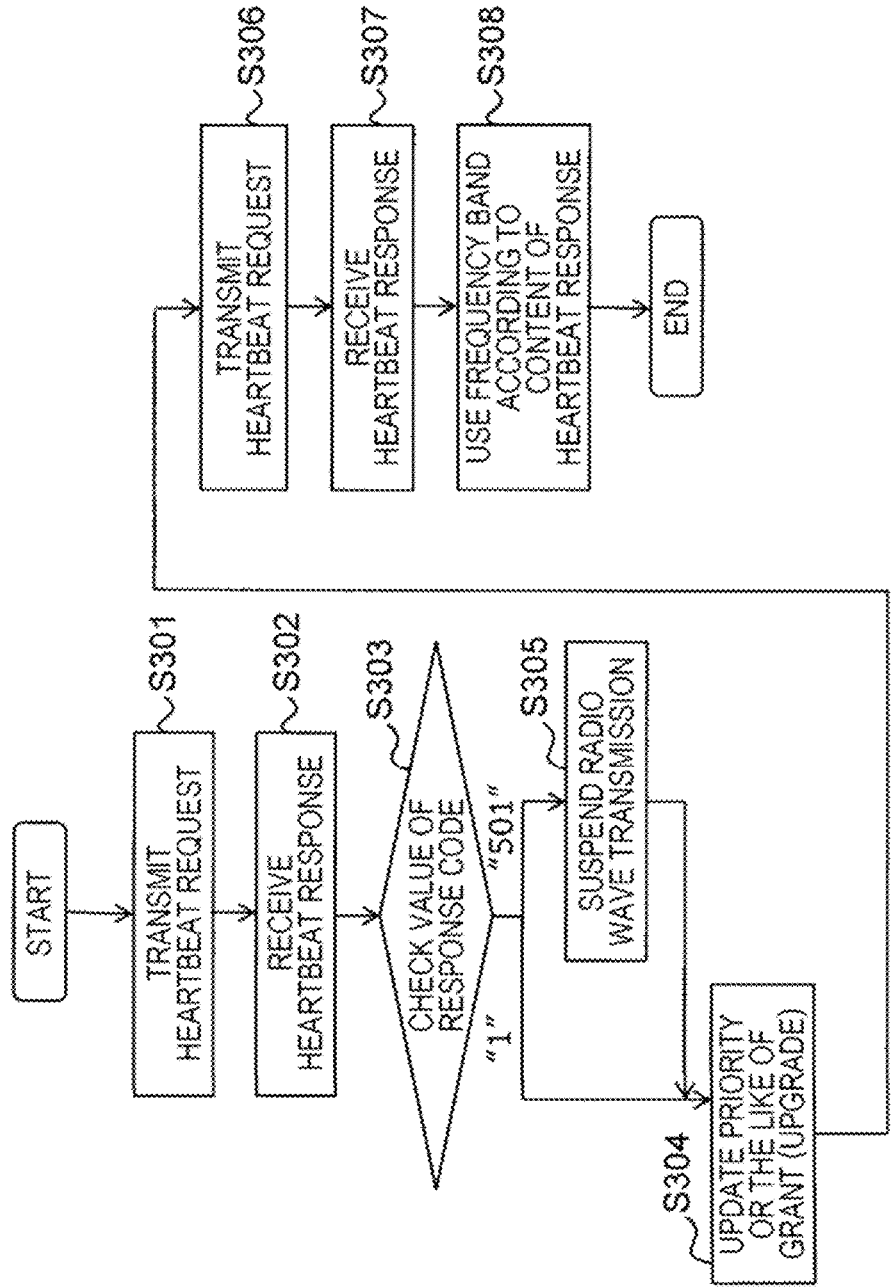
FIG. 12 is a flowchart illustrating an example of an operation of the communication device according to the embodiment of the present disclosure.

FIG. 12 is a flowchart illustrating an example of the operation of the communication device 110 according to the present embodiment. Here, an operation in a case where the grant is upgraded will be described as an example. The communication control device 130 is provided with a PPA Creation request (application data) from the operator of the communication device 110 in advance, and the communication control device 130 acquires the request. In the communication control device 130, it is assumed that the processing of step S202 of FIG. 10 is performed on the basis of the request. Note that the PPA Creation request may be provided to the communication control device 130 via a web service provided by the communication control device 130, or the communication device 110 may generate the PPA Creation request and provide the PPA Creation request to the communication control device 130. Alternatively, the communication device 110 may generate a PPA Creation request in accordance with the content of the PPA Creation request set by the operator and provide the PPA Creation request to the communication control device 130.

The transmitter 14 of the communication device 110 transmits a heartbeat request for a grant (target grant) included in the grant ID list applied in the PPA Creation request at a predetermined timing of the heartbeat procedure (S301). The PPA Creation application information is stored in the storage 16 of the communication device 110.

The receiver 11 of the communication device 110 receives a heartbeat request transmitted from the communication control device 130 in response to the heartbeat request transmitted from the transmitter 14 (S302).

The processor 13 checks the value of the response code included in the heartbeat response (S303).

In a case where the response code is 0 (SUCCESS), the channel type of the target grant is changed from GAA to PAL, and the expiration time of the grant is changed according to the expiration time of PAL (S304). Furthermore, in a case where the change of the operating parameter (at least one of operating frequency range and transmission power, and the like) is designated, the value of the operating parameter is changed (S304). The processor 13 stores the changed information in the storage 16. Note that, in a case where the application for the subject grant has been rejected, these changes may not be made. In this case, the transmitter 14 may transmit a message notifying that the application for the target grant has been rejected to the terminal of the operator.

In a case where the response code is 501 (SUSPENDED_GRANT), processing for suspending radio wave transmission is performed (S305). Thereafter, the same process as step S304 is performed. The radio wave transmission remains suspended.

The transmitter 14 of the communication device 110 transmits a heartbeat request including a changed (upgraded) grant parameter at a timing in the next heartbeat procedure (S306).

The receiver 11 of the communication device 110 receives a heartbeat request transmitted from the communication control device 130 in response to the heartbeat request transmitted from the transmitter 14 (S307).

In a case where the response code included in the heartbeat response is 0 (success), the frequency band of the upgraded grant can be continuously used (S308). In a case where the response code included in the heartbeat response received in step S302 is 501, the suspension of the radio wave transmission related to the grant is canceled, and the radio wave transmission is resumed in the frequency band of the upgraded grant.

Figure 13:
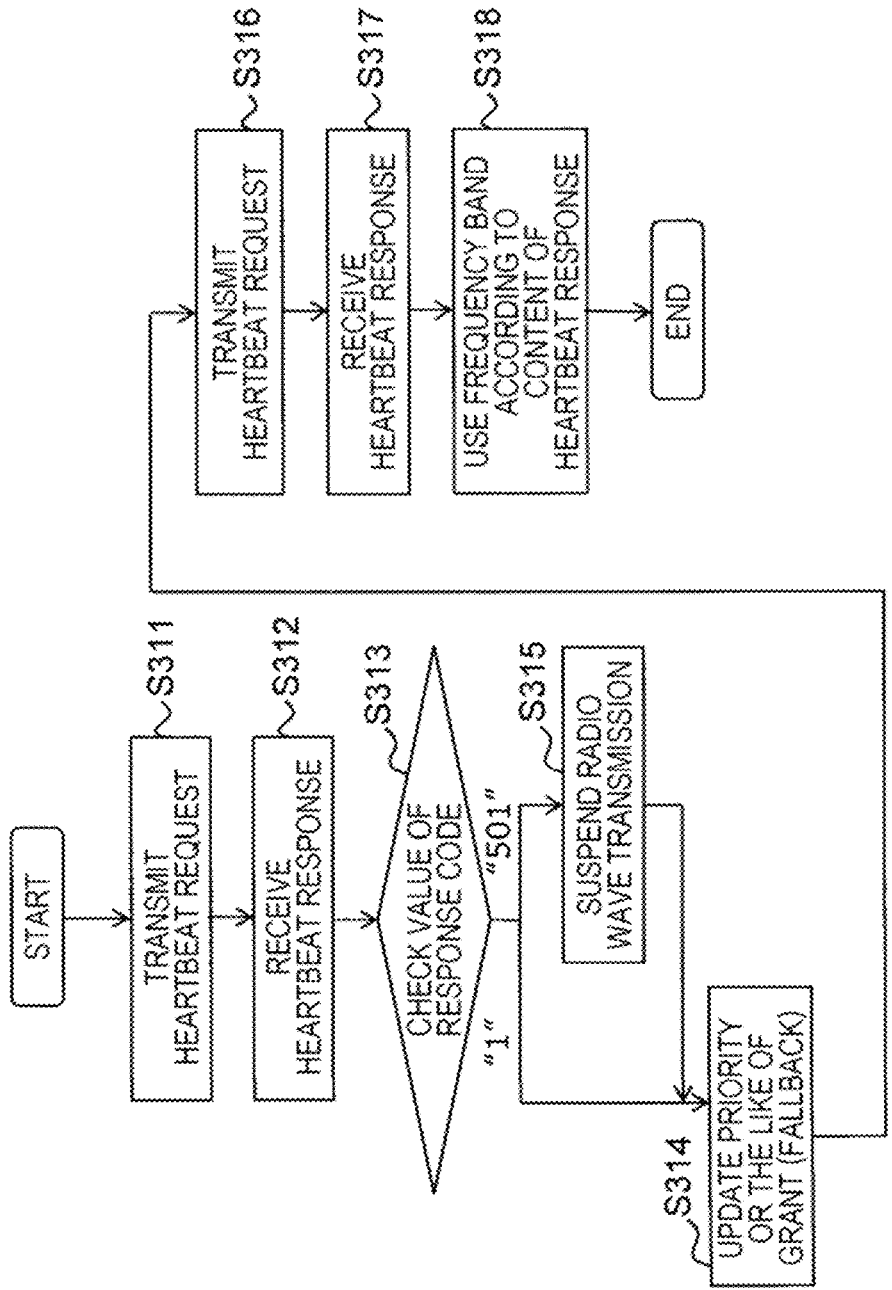
FIG. 13 is a flowchart illustrating another example of the operation of the communication device according to the embodiment of the present disclosure.

FIG. 13 is a flowchart illustrating another example of the operation of the communication device 110 according to the present embodiment. Here, an operation in a case where the fallback (downgrade) of the grant is performed will be described as an example.

The transmitter 14 of the communication device 110 transmits a heartbeat request related to the upgraded grant at a predetermined heartbeat procedure timing (S311).

The receiver 11 of the communication device 110 receives a heartbeat request transmitted from the communication control device 130 in response to the heartbeat request transmitted from the transmitter 14 (S312).

In a case where the instruction of the change (fallback) of the channel type of the grant is detected on the basis of the heartbeat response, the processor 13 performs the following processing according to the value of the response code (S313).

In a case where the response code is 0 (SUCCESS), the channel type of the target grant is changed from PAL to GAA, and the expiration time of the grant is changed to the expiration time of GAA (S314). Furthermore, the operating parameters (at least one of operating frequency range and transmission power, and the like) are also changed to the operating frequency range and transmission power of the GAA. The processor 13 stores the changed information in the storage 16.

In a case where the response code is 501 (SUSPENDED_GRANT), processing for suspending radio wave transmission is performed (S315). Thereafter, the same process as step S314 is performed. The radio wave transmission remains suspended.

The transmitter 14 of the communication device 110 transmits a heartbeat request including a grant parameter after the change (falldown) at a timing in the next heartbeat procedure (S316).

The receiver 11 of the communication device 110 receives a heartbeat request transmitted from the communication control device 130 in response to the heartbeat request transmitted from the transmitter 14 (S317).

In a case where the response code included in the heartbeat response is 0 (success), the frequency band of the downfolded grant can be continuously used (S318). In a case where the response code included in the heartbeat response received in step S312 is 501, the suspension of the radio wave transmission is canceled, and the radio wave transmission is resumed in the frequency band of the downfolded grant.

As described above, according to the present embodiment, the communication control device 130 (SAS or the like) is notified of the grant to be upgraded by the PPA Creation request. In a case where a heartbeat request related to a target grant is received from the communication device 110 (CBSD or the like), the communication control device 130 transmits a heartbeat response including information instructing an upgrade of the grant (change of priority from GAA to PAL) or the like. This allows for easy and early execution of grant upgrades utilizing heartbeat procedures. In addition, in a case where the upgraded grant no longer satisfies the requirements of the PAL, a heartbeat response instructing fallback of the grant (change of priority from the PAL to the GAA) is transmitted to the heartbeat request related to the upgraded grant. Thereby, the fallback of the grant can be easily and early performed using the heartbeat procedure.

Note that the above-described embodiments illustrate examples for embodying the present disclosure, and the present disclosure can be implemented in various other forms. For example, various modifications, substitutions, omissions, or combinations thereof can be made without departing from the gist of the present disclosure. Such modifications, substitutions, omissions, and the like are also included in the scope of the present disclosure and are included in the invention described in the claims and the equivalent scope thereof.

Furthermore, the effects of the present disclosure described in the present specification are merely examples, and other effects may be provided.

Note that the present disclosure can also have the following configurations.

[Item 1]

A communication control device including:

an acquirer configured to acquire application data for changing a priority of radio wave use of a communication device from a second priority lower than a first priority to the first priority on the basis of a right to perform radio wave use with the first priority;

a receiver configured to receive a frequency use notification notifying that the communication device is performing the radio wave use with the second priority; and a processor configured to update the priority of the radio wave use by the communication device from the second priority to the first priority in a case where the frequency use notification is received after the application data is acquired.

[Item 2]

The communication control device according to item 1, further including:

a transmitter configured to transmit, in response to the frequency use notification, response information for notifying that the priority of the radio wave use of the communication device has been changed from the second priority to the first priority.

[Item 3]

The communication control device according to item 1 or 2, in which the processor sets an expiration time of radio wave use by the communication device with the first priority on the basis of the right.

[Item 4]

The communication control device according to any one of items 1 to 3, in which the processor sets a frequency band permitted to be used with the first priority on the basis of a frequency range in which a frequency band available with the first priority and a frequency band used by the communication device with the second priority are common.

[Item 5]

The communication control device according to any one of items 1 to 4, in which the processor determines a frequency channel included in the common frequency range among frequency channels available with the first priority as a frequency band available with the first priority.

[Item 6]

The communication control device according to any one of items 1 to 5, in which the application data includes a request for creating, by one or more of the communication devices, a coverage area for protecting radio wave use with the first priority from interference due to radio wave use with the second priority.

[Item 7]

The communication control device according to item 6, further including:

a controller configured to create the coverage area on the basis of the application data and protect the radio wave use with the first priority from interference due to the radio wave use with the second priority in the coverage area.

[Item 8]

The communication control device according to any one of items 1 to 7, in which the application data includes an identifier for identifying the right.

[Item 9]

The communication control device according to any one of items 1 to 8, in which the application data includes information on a frequency band for which the priority of the radio wave use is to be changed from a second priority lower than the first priority to the first priority.

[Item 10]

The communication control device according to any one of items 2 to 9, in which the receiver receives a frequency use notification notifying that the communication device is performing the radio wave use with the first priority, the processor updates the priority of the radio wave use by the communication device from the first priority to the second priority in a case where the processor detects that a requirement for retaining the right is no longer satisfied, and the transmitter transmits response information for notifying that the priority of the radio wave use of the communication device has been changed from the first priority to the second priority.

[Item 11]

A communication device of an operator that has a right to perform radio wave use with a first priority, the communication device including:

a transmitter configured to transmit a frequency use notification notifying that the radio wave use is performed with a second priority lower than the first priority;

a receiver configured to receive response information transmitted in response to the frequency use notification; and a processor configured to update the priority of the radio wave use from the second priority to the first priority in a case where the response information includes information for changing the priority of the radio wave use from the second priority to the first priority.

[Item 12]

The communication device according to item 11, in which the transmitter transmits a frequency use notification notifying that the radio wave use is performed with the first priority, the receiver receives response information transmitted in response to the frequency use notification, and the processor updates the priority of the radio wave use from the first priority to the second priority in a case where the response information includes information for changing the priority of the radio wave use from the first priority to the second priority.

[Item 13]

A communication control method including:

acquiring application data for changing a priority of radio wave use of a communication device from a second priority lower than a first priority to the first priority on the basis of a right to perform radio wave use with the first priority;

receiving a frequency use notification notifying that the communication device is performing the radio wave use with the second priority; and updating the priority of the radio wave use by the communication device from the second priority to the first priority in a case where the frequency use notification is received after the application data is acquired.

[Item 14]

A communication method performed by a communication device of an operator having a right to perform radio wave use with a first priority, the communication method including:

transmitting a frequency use notification notifying that the radio wave use is performed with a second priority lower than the first priority;

receiving response information transmitted in response to the frequency use notification; and updating the priority of the radio wave use from the second priority to the first priority in a case where the response information includes information for changing the priority of the radio wave use from the second priority to the first priority.

REFERENCE SIGNS LIST

31 Receiver
32 Determiner
33 Processor
34 Transmitter
35 Controller
36 Storage
31A Acquirer
11 Receiver
13 Processor
14 Transmitter
15 Controller
16 Storage
100 Communication network
110, 110A, 110B, 110C Communication device
120 Terminal
130, 130A, 130B Communication control device

The invention claimed is:

1. A communication control device comprising:
circuitry configured to
acquire information related to a change from a second priority lower than the first priority in priority of radio wave use of a communication device to the first priority based on a right to perform radio wave use with the first priority;

control reception of a frequency use notification; and
update the priority of the radio wave use by the communication device from the second priority to the first priority in a case where the frequency use notification is received after the information related to the change to the first priority is acquired.

2. The communication control device according to claim 1, wherein
in response to the frequency use notification, the circuitry is configured to control transmission of, response information for notifying that the priority of the radio wave use of the communication device has been changed from the second priority to the first priority.

3. The communication control device according to claim 1, wherein
the circuitry is configured to set an expiration time of radio wave use by the communication device with the first priority on a basis of the right.

4. The communication control device according to claim 1, wherein
the circuitry is configured to set a frequency band permitted to be used with the first priority on a basis of a frequency range in which a frequency band available with the first priority and a frequency band used by the communication device with the second priority are common.

5. The communication control device according to claim 4, wherein
the circuitry is configured to determine a frequency channel included in the common frequency range among frequency channels available with the first priority as a frequency band available with the first priority.

6. The communication control device according to claim 1, wherein
the information related to the change to the first priority includes a request for creating, by one or more of the communication devices, a coverage area for protecting radio wave use with the first priority from interference due to radio wave use with the second priority.

7. The communication control device according to claim 6, wherein further comprising:
the circuitry is configured to create the coverage area on a basis of the information related to the change to the first priority and protect the radio wave use with the first priority from interference due to the radio wave use with the second priority in the coverage area.

8. The communication control device according to claim 1, wherein
the information related to the change to the first priority includes an identifier for identifying the right.

9. The communication control device according to claim 1, wherein
the information related to the change to the first priority includes information on a frequency band for which the priority of the radio wave use is to be changed from a second priority lower than the first priority to the first priority.

10. The communication control device according to claim 2, wherein
the circuitry is configured to control reception of a frequency use notification notifying that the communication device is performing the radio wave use with the first priority,
the circuitry is configured to update the priority of the radio wave use by the communication device from the first priority to the second priority in a case where the circuitry detects that a requirement for retaining the right is no longer satisfied, and
the circuitry is configured to control transmission of response information for notifying that the priority of the radio wave use of the communication device has been changed from the first priority to the second priority.

11. The communication control device according to claim 4, wherein
in a case where a frequency range used by the communication device with the second priority includes a frequency channel permitted under the right, the circuitry is configured to update the priority of the radio wave use by the communication device from the second priority to the first priority on condition that the radio wave use is set to the same frequency range as the frequency channel.

12. The communication control device according to claim 1, wherein
in a case where a frequency range used by the communication device with the second priority matches a frequency channel permitted under the right, the circuitry is configured to update the priority of the radio wave use by the communication device from the second priority to the first priority.

13. The communication control device according to claim 1, wherein
the information related to the change to the first priority includes a request for creating a coverage area for protecting the radio wave use with the first priority from interference due to the radio wave use with the second priority so as to include one or more of the communication devices for which the priority of the radio wave use is to be changed.

14. The communication control device according to claim 1, wherein
the circuitry is further configured to control reception of a heartbeat request.

15. A communication device of an operator that has a right to perform radio wave use with a first priority, the communication device comprising:
circuitry configured to
control transmission of a frequency use notification;
control reception of response information transmitted in response to the frequency use notification; and
update the priority of the radio wave use from a second priority lower than the first priority to the first priority in a case where the response information includes information for changing the priority of the radio wave use from the second priority to the first priority.

16. The communication device according to claim 15, wherein
the circuitry is configured to control transmission of a frequency use notification notifying that the radio wave use is performed with the first priority,
the circuitry is configured to control reception of response information transmitted in response to the frequency use notification, and
the circuitry is configured to update the priority of the radio wave use from the first priority to the second priority in a case where the response information includes information for changing the priority of the radio wave use from the first priority to the second priority.

17. A communication control method comprising:
acquiring information related to a change from a second priority lower than the first priority in priority of radio wave use of a communication device to the first priority based on a right to perform radio wave use with the first priority;

receiving a frequency use notification; and updating the priority of the radio wave use by the communication device from the second priority to the first priority in a case where the frequency use notification is received after the information related to the change to the first priority is acquired.

18. A communication method performed by a communication device of an operator having a right to perform radio wave use with a first priority, the communication method comprising:

transmitting a frequency use notification;

receiving response information transmitted in response to the frequency use notification; and updating the priority of the radio wave use from a second priority lower than the first priority to the first priority in a case where the response information includes information for changing the priority of the radio wave use from the second priority to the first priority.

19. A communication device of an operator having a right to perform radio wave use with a first priority, the communication device comprising:

circuitry configured to control transmission of a frequency use notification; and control reception of response information transmitted in response to the frequency use notification, wherein in a case where the response information includes information for changing the priority of the radio wave use from a second priority lower than the first priority to the first priority, the radio wave use is performed with the first priority in the same frequency range as a frequency channel permitted under the right.

\* \* \* \* \*